US012106250B2

(12) United States Patent
Srinivasa et al.

(10) Patent No.: US 12,106,250 B2
(45) Date of Patent: Oct. 1, 2024

(54) SKILL-GAP ANALYSIS AND RECOMMENDER SYSTEM

(71) Applicant: PES University, Bengaluru (IN)

(72) Inventors: Gowri Srinivasa, Bengaluru (IN); Chiranth Jawahar, Bengaluru (IN); Diya Chandra, Bangalore (IN); Namrata Ramesh, Bangalore (IN)

(73) Assignee: PES UNIVERSITY, Bengaluru (IN)

( * ) Notice: Subject to any disclaimer, the term of this patent is extended or adjusted under 35 U.S.C. 154(b) by 337 days.

(21) Appl. No.: 17/693,691

(22) Filed: Mar. 14, 2022

(65) Prior Publication Data

US 2023/0230011 A1    Jul. 20, 2023

(30) Foreign Application Priority Data

Jan. 14, 2022    (IN) ............................. 202241002228

(51) Int. Cl.
*G06Q 10/00* (2023.01)
*G06F 16/903* (2019.01)
*G06Q 10/0639* (2023.01)
*G06Q 50/20* (2012.01)

(52) U.S. Cl.
CPC .   *G06Q 10/06393* (2013.01); *G06F 16/90335* (2019.01); *G06Q 50/2057* (2013.01)

(58) Field of Classification Search
CPC ......... G06Q 10/06393; G06Q 50/2057; G06Q 10/1053; G06Q 50/2053; G06F 16/90335; G06F 16/3331
See application file for complete search history.

(56) References Cited

U.S. PATENT DOCUMENTS

| 2015/0120593 | A1* | 4/2015 | Madhavan | ......... G06Q 50/2057 |
| | | | | 705/321 |
| 2017/0154307 | A1* | 6/2017 | Maurya | ............... G06F 16/9535 |
| 2017/0206503 | A1* | 7/2017 | Harris | ................. G06F 16/3344 |

OTHER PUBLICATIONS

A. Sanjay Rathee and Arti Kahyap. ("Adaptive-Miner: an efficient distributed association rule mining algorithm on Spark". J Big Data 5, 6 (2018). https://doi.org/10.1186/s40537-018-0112-0.) (Year: 2018).*

* cited by examiner

*Primary Examiner* — Gabrielle A McCormick
(74) *Attorney, Agent, or Firm* — Rangarajan Sourirajan; RAJAN LAW OFFICE, LLC

(57) ABSTRACT

A skill-gap analysis and recommender system and method is described that serves as a personalized education and skill (PES) map. It provides a comprehensive presentation of the opportunities afforded by the University along with a detailed analysis of trends for placements and career goals. It conducts a comprehensive analysis of past student data and current market trends to make recommendations that are adapted to each student's profile in line with their individual career goals. This is accomplished using an algorithm for adaptive association pattern mining with a built-in mechanism for creation of meta-categories and drill-down for specifics, so as to meet the needs of every student and not miss infrequent patterns or rare opportunities afforded by the system. For the recommendations generated, the system also provides an assessment of the time-sensitivity of a goal and a mechanism for students to track their progress through prioritizing short and long term goals.

14 Claims, 23 Drawing Sheets

SKILL-GAP ANALYSIS AND RECOMMENDER SYSTEM

BACKGROUND OF THE INVENTION

This invention in general relates to the field of education, and specifically refers to a computer implemented method of skill gap analysis and recommendations in educational institutions.

A college freshman may not have a clear idea of their major or the opportunities afforded by their educational institution and career options when they graduate. While most commercial ERP systems or employment websites attempt to match the skills required for a given job description with the current work force available (i.e., registered in the system) based on the profile data and parsing of the resume, such systems do not help a student with goal-setting or charting out a plan with recommendations on the courses they should credit for a particular type of job. Similarly, learning analytics and assessment tools that are currently available, may provide a useful dashboard to analyze students' performance in a course across years or even track an individual's student's progress through multiple courses and years. While these may provide insight to course instructors and syllabus committees on the curriculum design, manner of delivery and assessment of courses in a manner that would best benefit a student and fulfill the learning outcomes, they do not necessarily tie these parameters with the final result of placement of students in companies or admits from places of higher learning or the success of a student as an entrepreneur.

SUMMARY OF THE INVENTION

The present invention, a skill-gap analysis and recommender system and method, serves as a personalized education and skill (PES) map. It bridges the gaps identified with a comprehensive presentation of the opportunities afforded by the University (in terms of courses for credit in various departments, internship and study-abroad opportunities, off-semester programs, events on and off-campus, scholarships, volunteering opportunities, teaching and research assistantships on and off campus, etc.), along with a detailed analysis of trends for placements and admits to institutions of higher learning as well as helping a student chalk out a path to fulfil their career goals. The system uses a comprehensive analysis of past student data and current market trends to make recommendations that are adapted to each student's profile in line with their individual career goals. This is accomplished using an algorithm for adaptive association pattern mining with a built-in mechanism for creation of meta-categories and drill-down for the specifics, so as to meet the needs of every student and not miss infrequent patterns or rare opportunities afforded by the system. For the recommendations generated, the system also provides an assessment of the time-sensitivity of a goal and a mechanism for students to track their progress through prioritizing short and long term goals. These goals are assessed at regular intervals with reminders at a frequency determined by the user and alerts to any opportunities that would facilitate achieving the goals. Further, there is a provision for course correction or adapting to the changing aspirations of a student through modifying the queries or opportunities to be tracked, leading to a change in the recommendations made by the system and in turn a modification of the goals.

Advantageously, the method and system described herein applies a modified association pattern mining algorithm, incorporating the dynamic formation of metacategories through (i) considering instantiations within a single category as equivalent and encoding its 'presence' (1) or 'absence'(0) or (ii) clustering of related categories through a curated and/or domain-aware hierarchy of categories to be able to get meaningful frequent itemsets. Once the itemsets contribute to the generation of association patterns or rules, there is an automated drill down within the sub-set of relevant rows of the data to match with the student's profile and elicit the most relevant instantiations of the metacategory to make meaningful specific recommendations. This dynamic abstraction of metacategories for forming of itemsets and drill-down of a category during the generation of a recommendation with built-in checks to ensure the process results in the most comprehensive and meaningful recommendations, modeling the trend in historical data and accommodating outliers in the dataset, while helping to form new associations (through observing changes in the instantiations within a category) and thereby adapt to changes in real-time, specifically applied in the context of skill gap analysis and recommendations for students in a University/academic institutional setting.

In contrast, in the traditional approach to association pattern mining, the Apriori Algorithm, is based on generating association rules from frequent itemsets that are formed based on the frequency of items. The traditional approach disadvantageously misses out on infrequent patterns that are important. In the prior art, even the provision of minimum support to include items that are less frequent pose a problem as there are disparate frequencies of items.

The system described herein is truly personalized and adapts entirely to a user's needs and a platform to let the user explore multiple options and set and track their own goals. Recommendations are provided in a manner that do not discount options merely because there are fewer instances of that in the repository through an adaptive mining of relevant patterns.

The recommendation system described herein delineates (i) actionable next steps (for courses that can be credited in the upcoming semesters, internship opportunities, projects that can be undertaken, etc.), (ii) remedial next steps with respect to track record (such as courses credited in the past for which the grades cannot be changed, but some additional work that can be taken up to demonstrate the required skill level) and (iii) bonus next steps with regard to exceptional additional skills that would not be deemed necessary, but would help a student distinguish themselves and demonstrate an ability that would be of value for the opportunity they seek (soft skills demonstrated through leadership roles or volunteering or working with teams from across institutions or different countries, etc.)

The method and system described herein allows users to explore opportunities available in the industry, academia and research institutes as well as gaining some understanding of the market for potential entrepreneurs. It enables a user to check their progress at will and modify the goals as their aspirations and exposure to the opportunities evolve.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computerized system for receiving a real time goal set by a student. The computerized system also includes an input/output device serving as an interface for said student; a controller processing unit and operating system, with transfer of control from said input/output device to a personalized education and skill map generator module; a database repository of student, university and recruiter information; said personalized education and skill map generator module, may include: a search engine for receiving a query from said student on a career goal, parsing of said query of said student to extract question words, named entities and discourse markers, and map said extractions to relevant instances in said database, where said search engine applies a modified adaptive association pattern mining model for creation of meta categories to capture infrequent patterns or rare opportunities available to the student, and conducts a drill-down for specifics to cater to individual needs of said student, said modified adaptive association pattern mining model performing the processes of: dynamically forming categories through recording instantiations within a single category as equivalent, and encoding its presence' (1) or absence' (0), and clustering of related categories through a curated and/or domain-aware hierarchy of categories to determine meaningful frequent itemsets, where said itemsets contribute to the generation of association patterns or rules; automatically drilling down within a sub-set of relevant rows of data to match with a student's profile and elicit the most relevant instantiations of a metacategory to make meaningful specific recommendations to the student; modeling a trend in historical data and accommodating outliers in a dataset, and forming new associations through observing changes in the instantiations within a category and thereby adapting to changes in real-time. The system also includes a skill gap analyzer module for checking aggregated statistics for a search conducted through said search engine against a skill level of said student, and identifying the skill gap of the student; recommender module for identifying a temporal factor for every said skill gap to suggest remedial or actionable next steps and for identifying a frequency to suggest actionable next steps' or bonus next steps' recommendations based on past data; and goal tracker module for presenting a list of all said recommendations ordered in a decreasing order of their importance and urgency, where said goal tracking module provides an assessment of a time-sensitivity of a goal and a mechanism for students to track their progress through prioritizing short and long term goals, and where these goals are assessed at regular intervals with reminders at a frequency determined by a user and alerts to any opportunities that would facilitate achieving the goals. Other embodiments of this aspect include corresponding computer systems, apparatus, and computer programs recorded on one or more computer storage devices, each configured to perform the actions of the methods.

Implementations may include one or more of the following features. The system may include: a resume parser and resume generator in communication with said controller; a user database updater that checks for may include and redundancy of the information elicited by said resume parser; a relevant academic information extractor that extracts academic data from university sources in said database; and a job description, skills and salary details parser that parses the recruiting forms for job related information and stores in the job and skill description repository with a timestamp to keep track of hiring firms that are returning to make offers. Said output device may include a touchscreen device or monitor through which is output results of the search, an alarm or alert for time sensitive goals, a message to track progress for the goals set earlier and screens to output the result of the search. The system may include a user feedback module that the user can choose to engage with to provide feedback on one or more of the following: satisfaction of query processing, said skill gaps identified, said recommendations and priorities accorded, and information ferreted about a company, university, or funding agency. The system may include an analytics dashboard with filters for visualization for a choice of a recruiting company in correlation with the importance of core courses, choice of electives, grades in various courses, number and type of internships and number of type of projects. Said analytics dashboard provides a job placement office of said institution with the type of recruiting companies, skill sets required, and timeline of requesting for interviews with said student(s). Said skill gap analyzer module and said search engine sets and track personal goals, with a continual update of the opportunities and with a provision for said goals to evolve. Said recommendation module recommends actions that can be taken at three levels: actionable next steps, remedial next steps and bonus next steps towards reaching the goals set. Said recommendation module mines association patterns and elicits rules towards tangible recommendations after identifying obvious trends and, and at the same time, does not preclude patterns that are less frequent but still hold significance for said goals. Said personalized education and skill map generator module adapts to evolving aspirations of the student and to dynamic changes in options after graduation through a process of continuous monitoring and regular updates, providing for course correction or adapting to changing aspirations of the student through modifying the queries or opportunities to be tracked, leading to a change in the recommendations made by said system and in turn a modification of said goals. Said personalized education and skill map generator module identifies internships and job placements in industry or academia, and provides recommendations to secure said internships and job placements. Implementations of the described techniques may include hardware, a method or process, or computer software on a computer-accessible medium.

One general aspect includes a computer implemented method for personalized education and skill mapping of a student in an educational institution. The computer implemented method also includes updating academic and skills repository of said student; performing skill gap analysis and displaying a progress chart for all goals set by the student and displaying alerts for time sensitive goals; providing the student an option to edit said goals, and thereafter updating a goal tracker; accepting a student search query text, and processing the query aided by inputs from the student's academic and skills repository, hiring firm's details and university details. The method also includes parsing of said query of said student to extract question words, named entities and discourse markers, and map said extractions to relevant instances in a database, and applying a modified adaptive association pattern mining model for creation of meta categories to capture infrequent patterns or rare opportunities available to the student, and conducts a drill-down for specifics to cater to individual needs of said student; applying similarity measures to map descriptions and positions advertised by named entities in said query without a match to the closest group of named entities in company details and job and skill description database; extracting trends corresponding to said named entities; presenting visualizations and word interpretations of said trends; extracting relevant association textual patterns from archived data and generate rules; matching said rule generated against student's data; outputting the skill gap with visualization and list of recommendations, and tagging said recommendation with temporal data and frequency of the rule for updating said goal tracker and alerts; and outputting results of said search query with recommendations. Other embodiments of this aspect include corresponding computer systems, apparatus, and computer programs recorded on one or more computer storage devices, each configured to perform the actions of the methods.

Implementations may include one or more of the following features. The method where said step of matching said rule generated against student's data further may include the steps of: where if said rule is not fulfilled; assessing an extent of skill gap; determining the frequency and temporal component associated with the skill gap; where if the skill gap does not pertain to a past; where if the rule associated with the skill gap is not a frequent one; include the rule in the list of recommendations with bonus next steps to meet or exceed general expectations for a role; where if the rule associated with the skill gap is a frequent one, include the rule in the list of recommendations with actionable next steps to bridge the gap by acquiring missing skills; and where if the skill gap pertains to a past; including the rule in the list of recommendations with a remedial next step to bridge the gap through crediting additional courses or undertaking a relevant project. Implementations of the described techniques may include hardware, a method or process, or computer software on a computer-accessible medium.

DETAILED DESCRIPTION OF THE INVENTION

Figure 1A:
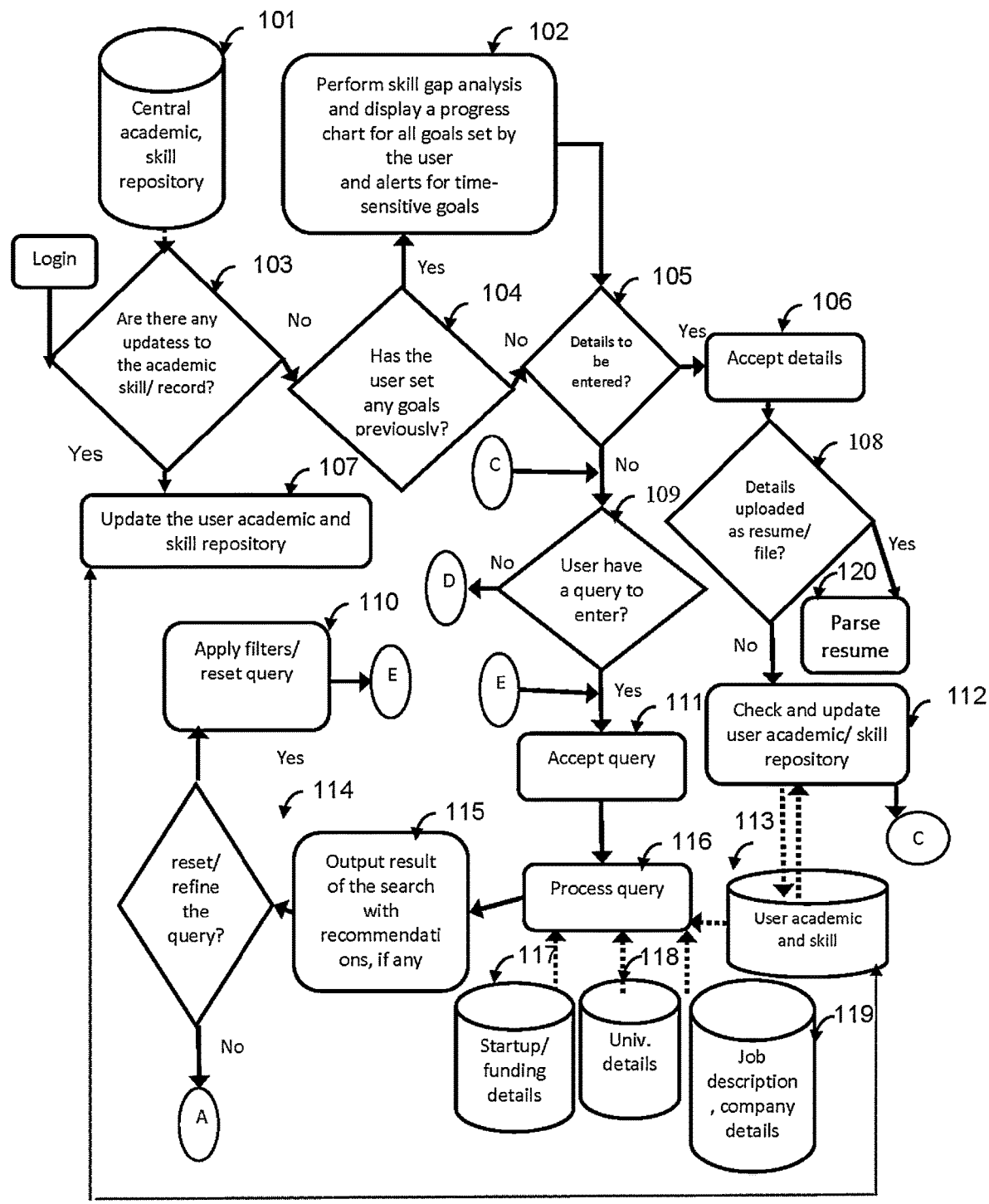
FIG. 1A illustrates a first part of the process flow of the entire system from user login to recommendations.

In the following description, for purposes of explanation, numerous specific details are set forth in order to provide a thorough understanding of the invention. It will be apparent, however, to one skilled in the art that the invention may be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Jobs in the industry are analyzed in terms of the skills and domains as well as the cost-to-company of an employee or salary package offered for a specific job description, their testing mechanism and interview process and the requirements met by students who have been given offers for such a position in the past. Likewise, admits to various programs of higher learning worldwide are analyzed in terms of the location of the program, ranking of the University, standing of the specific program, cost of the program (tuition fee, living expenses, etc.), offer of any stipends and placement prospects as on the time of the analysis, history of the program, etc. Likewise, in terms of an entrepreneurial venture, analyze the timeline of when the startup was founded, the area that the startup serves, the number of employees, funds raised and their sources, etc. All these are analyzed in tandem with the academic grades scored in specific courses, the combination of electives selected by the students, the number and type of projects undertaken, the number and type of internships undertaken by these students, leadership and volunteering roles, awards and certifications achieved, hobbies they have pursued or cultivated afresh, participation in clubs or student-led activities and contests, etc., of the alumni with their trajectories, to help students get an idea of where they stand in reference to past data, set personalized goals through recommendations provided by the system and track their progress and alert them to any time-sensitive actionable step, in addition to providing dynamic updates as the data of potential jobs/internships, admission process, etc., evolves.

The system described herein retrieves the entire academic records of a student and any other engagement with the system such as academic scholarships or teaching and research assistantships, together with the grade/feedback provided by the supervising faculty, etc.

The system described herein provides a platform for entry of details of the internships, projects, hobbies, etc., pursued by the students outside the campus (or not recorded by the system in the usual course).

The system described herein generates a detailed résumé (and, if the detailed résumé exceeds two pages, an abridged two-page version with an extract of the detailed resume) based on the information provided by the student and the records retrieved by the system. This also serves as an incentive for students to provide details from time to time as it can be used to facilitate the placement process The system described herein extracts broad trends and presents an analytics dashboard with filters for visualization for the choice of company in correlation with the importance of core courses, choice of electives, grades in various courses, number and type of internships and number of type of projects, etc.

The system described herein extracts interesting anomalies like students with a low grade securing a job with a high CTC delineating features that distinguish them from peers with similar grade profiles.

The system described herein provides a search option for students to query a system, exemplarily:
(i) 'What must I do to get a job in Company X?'
(ii) 'With my profile, what jobs am I likely to get in field Y?'
(iii) 'What are the job profiles offered by Company X?'
(iv) 'What are the common roles in the field of Y?'
(v) 'What courses should I take for a job in domain W?'
(vi) 'What are the options in City Z for the field of Y?'
(vii) 'What are the skills students looking for an internship in Company X typically have?'
(viii) 'What must I do to get into University A?'
(ix) 'What must I do to get into the Masters in <course> in University A?'
(x) 'What Universities are similar to University A or B in terms of their ranking?'
(xi) 'What Universities are similar to University A or B in terms of course offerings?'
(xii) 'What Universities are similar to University A or B in terms of their research funding?'
(xiii) 'How important is a publication for admission to University A?'
(xiv) 'What are the CGPA's of students who secured an admit to a direct PhD in the last two years?'
(xv) 'What are the funding opportunities for Round 1?'
(xvi) 'Which VC's funded startups in the Field of Y last year?'
(xvii) 'What are the startups that raised the most money last year?'
(xviii) 'What are the application areas in which startups raised over <amt> in the past year?'
etc.

The system described herein provides students with answers by analyzing trends and anomalies from alumni data available and through mapping of similarity between companies based on the skill sets, CTC and hiring process and other meta data available regarding the type of company (product or service), work culture, other technologies they work in, etc., or about institutions of hiring learning in the case of admits or about startups in the case of aspiring entrepreneurs.

The system described herein provides a skill gap analysis: an interface for students to analyze their present skills/academic performance against that of the trend for the type of aspirations they may have.

In tandem with the skill gap analysis, recommendations are made to help the student set short term goals (for instance, 'complete a project in domain W and aim for A grades in the internal assessment tests in courses P, Q and R', etc.) and long term goals ('select elective courses E3 and E4 in the upcoming semester, apply for an internship in any one of the following centers of excellence on campus C1, C2 or C3 over the winter break and follow this up with an industry internship in the summer', or 'prepare for GRE and ToEFL and plan to take these tests by the end of the fifth semester', etc.)

The system described herein provides the Placement Office with analytics dashboard for the type of companies, skill sets their looking for timeline of requesting for interviews with students, etc., to plan/forecast and reach out to other companies.

The system described herein provides a recommendation system with lists of the best matches for each company (either to let the students know they have matched and could consider interviewing with the company).

The system described herein provides a shortlist of students that best match with the skill sets to companies seeking to hire interns or full-time employees or to guidance counselors on the type of universities a student is likely to receive an admit from based on alumni data and evolving admission criteria, etc.

The system described herein provides course instructors and curriculum design committees with insight to the correlations between the skills taught and learning outcomes and placement information (industry hiring and University admits) to effect refinements and evolve the hands-on skills or course content based on the demonstrable impact on student's career prospects/professional growth. It also factors in feedback from the industry (post the hiring process) and Universities, wherever we can get access to this, to make more informed recommendations.

The system described herein provides the University leadership with a dashboard for various statistics and visualization with filters to roll up or drill down on any of the details regarding placements or admits and their tie in with a student's educational journey in the University and performance in academic and co-curricular and extra-curricular opportunities.

The system described herein provides reminders to students to track their progress and update the information at least once month (or more frequently, if they so choose).

The system described herein provides department coordinators, alumni liaisons and student mentors on campus with useful statistics on auxiliary data such as projects and publications from the Department, statistics (such as CGPA) on recipients of various scholarships and teaching and research assistantships on campus and featuring any success story that may be inspiring (such as a tracking the journey of a student with low CGPA in the first year securing a Tier 1 (among the highest CTC) job with highlighting the elements of their profile co-curricular and extra-curricular that distinguished them from their peers). It provides recommendations for special interviews or 'words of wisdom' from achievers on the opportunities on and off campus and inputs on making the most of these that are routinely featured on the system for all users to read about, if they choose to.

Figure 1B:
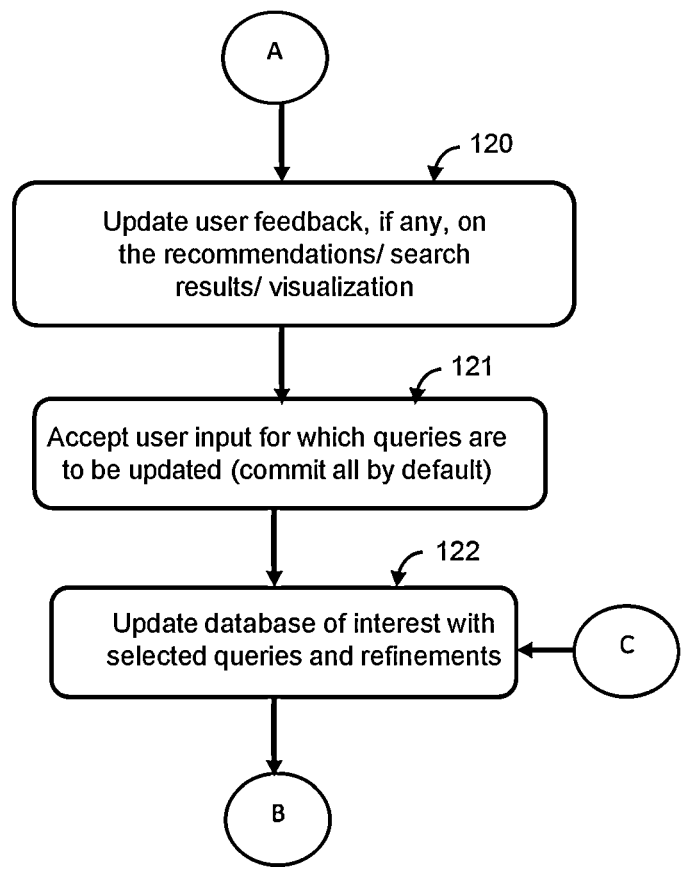
FIG. 1B illustrates a second part of the process flow of the entire system from user login to recommendations.
Figure 1C:
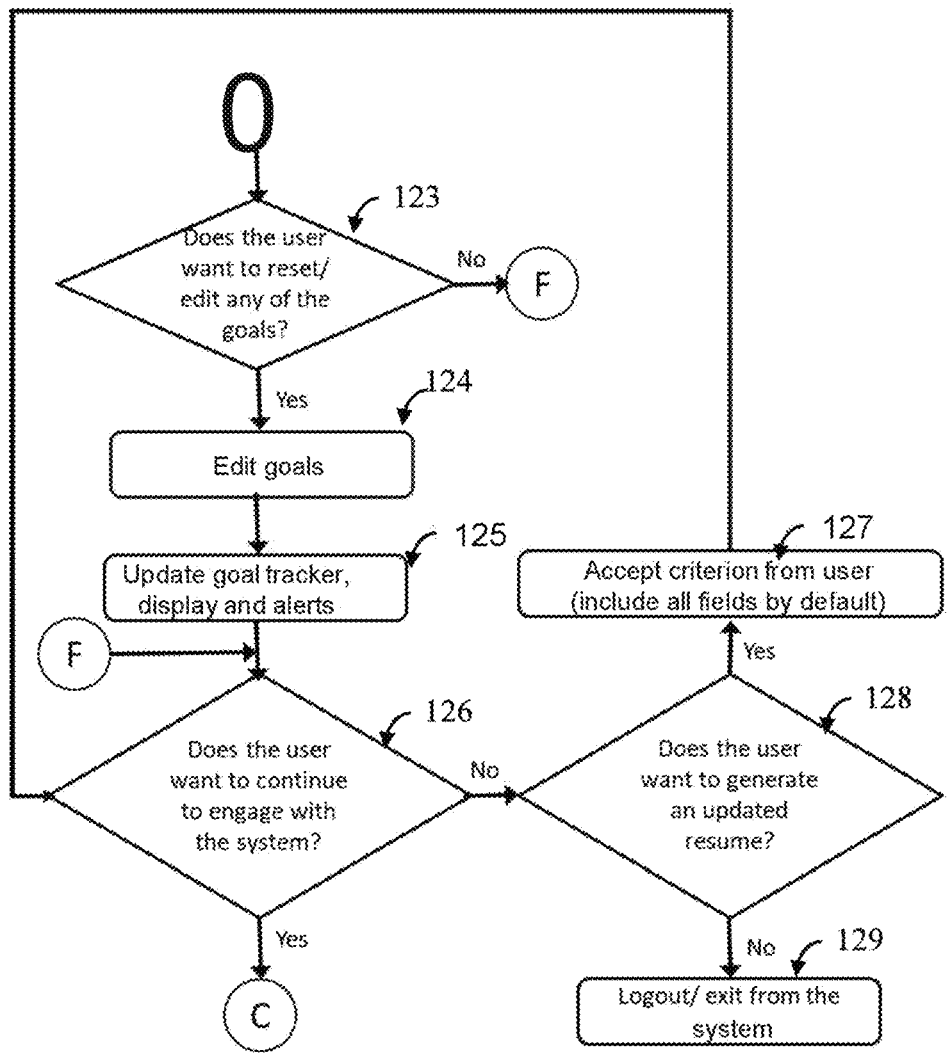
FIG. 1C illustrates a third part of the process flow of the entire system from user login to recommendations.

FIG. 1a, FIG. 1b and FIG. 1c illustrate the flow of the entire system from user login to recommendations.

Login to the system—The user logs into the system (or simply engages with the system if the user has not logged out previously). The user id helps identify user-specific information such as the user's academic performance and other skills, interests and aspirations based on search history and explicit entry of goals, and progress towards goals set.

If there are any updates 103 to the academic and skill profile of the user in the central repository 101 (from the examination section on the grades for midterms or semester-end exams, by the department on courses credited during a semester, etc.), these are checked against the current data in a user academic and skill repository used for processing by the system. The updates after processing comprise information extracted with relevant field tags and are updated in the user academic and skill repository used for processing.

If the user has set any goals 103 previously or made searches, these are tracked and updated. For instance, if a user searched for the details of a company and the statistics of the placement record has changed since the user's previous visit, the update is displayed on the dashboard. Likewise, if there are explicit goals delineated by the user 104 and any progress made (such as completion of a task or any part of it) these are checked with the user's academic and skill repository and updated. A skill gap analysis is conducted and a progress chat is displayed for all goals set by the user 102. If there are any time-sensitive goals (such as having to credit a course that forms a pre-requisite for a course the user must credit in a later semester, etc.)

If there are any further updates 103 to be entered that are not available from the central academic and skill repository 101 (such as off-campus internships or projects or courses credited online through independent study or participation in events for which the system has no record, etc.), those further updates are also accepted.

The details are entered manually through a form or uploaded by the user as a file 105.

If the details are entered as a resume/file 108, these are processed using the resume/file parser 120.

The updates 106 are accepted in the above-mentioned steps, after processing comprise information extracted for relevant fields and these are updated in the user academic and skill repository 107. It is checked if the user has a query 109 and the query is accepted 111.

The result of the search is output with accompanying visualizations and recommendations on the next step, if any.

The user is presented with an option to provide feedback 120 on the search results (in terms of the relevance, accuracy, etc.), on the recommendations or visualizations (or to manually enter additional information that is common knowledge/known the user but not elicited by the system from the patterns available in the repository), if the user so wishes, to help improve the system. This is an optional step for the user.

The user is also permitted to de-select queries that they do not wish to be 'remembered' by the system or to clear the search history if they do not want the recommendations to be biased by the recent search.

The user academic and skill repository/interests database is updated with the queries 122 (all queries by default, and only those selected by the user, if they chose to edit the list of searches and refinements) to facilitate providing updated information or recommendations related to these queries in the future.

If the user wishes to refine or reset the query, the user is presented with filters 110 to refine the query or reset the query to search for something else. The filters are provided with the search bar on the user interface and available to the user even when the query is entered.

If the query is to be reset or refined using filters 114, the new query is accepted and processed.

If there is no new query, the list of queries and recommendations is presented in reverse chronological order. The user is presented with an option to select these recommendations to set a goal or edit any of the goals that have already been set.

If the user wishes to refine or delete a goal 123 set earlier or add a new goal based on the result of the search query and recommendations, edits to the list of goals 124 are accepted.

Once the edits are made, the goal tracker is also updated 125 to track the progress of these updated milestones and set alerts for any time-sensitive goals (such as courses that need to be credited, etc.)

If the user does not wish to edit the goals 124 or after all the edits have been incorporated 125, it is checked if the user wants to continue to engage 126 with the system. If the user wishes to continue to engage with system 126, the user can enter a new search query that is subsequently processed.

If the user does not wish to engage further with the system, it is checked if they would like to generate a resume 128.

If the user wishes to generate the resume for a specific purpose 128 (through specifying the 'goal' in the interface provided), then the resume is generated through an automated selection of appropriate fields 127 (based on the analysis of past data conditioned on the specified 'goal') or through a manual selection of fields to be included or, if no 'goal' is specified, through a default selection of all fields with an option of de-selecting any field that is not relevant to the user; the resume thus generated can be downloaded by the user for later use.

Steps 123-126 are repeated if the does user does not want to engage any further with the system but would like to generate other versions of the resume and, If the user does not wish to engage further with the system or to generate any further versions of the resume, they can either logout or simply exit the system 129.

Figure 2A:
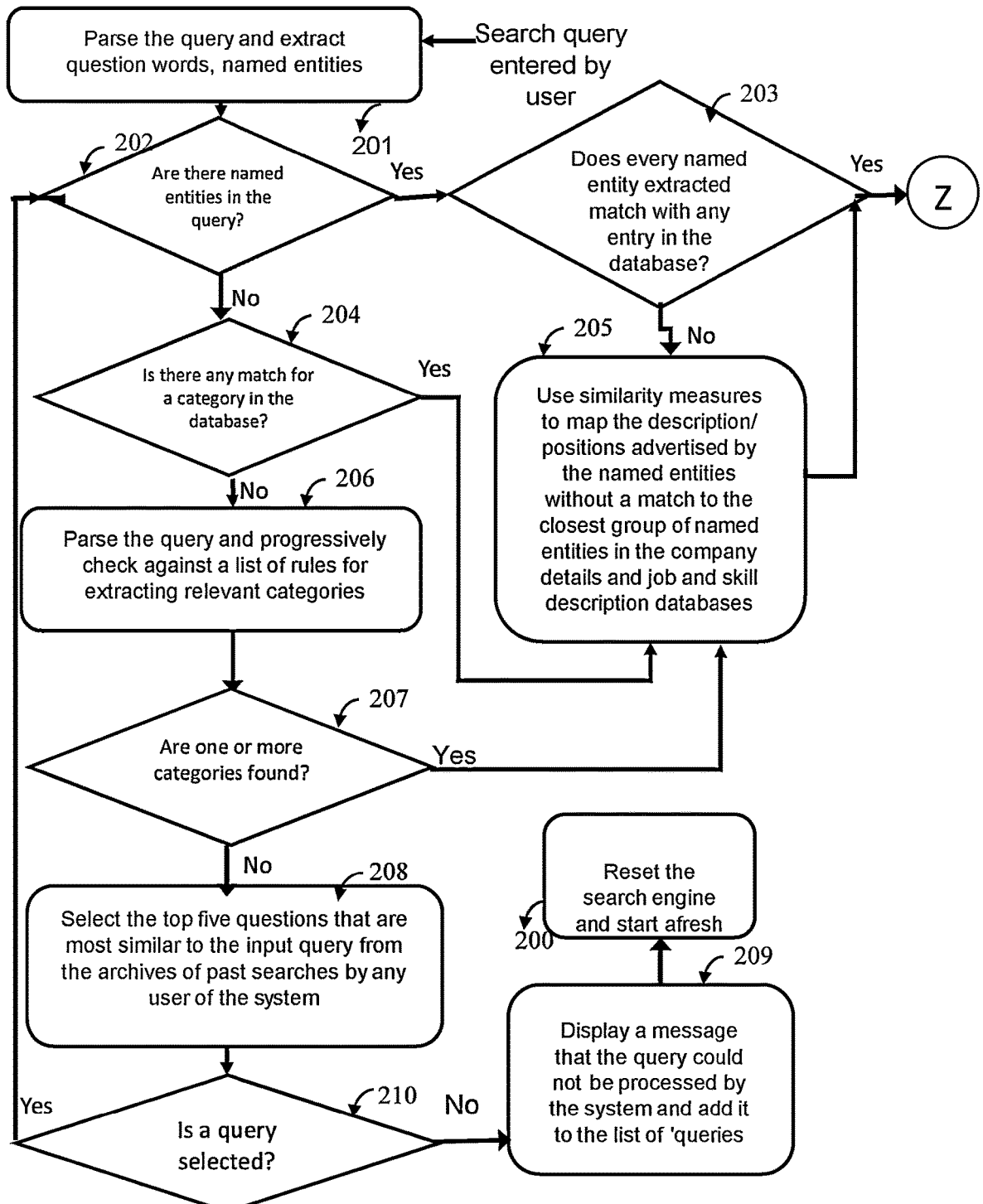
FIG. 2A illustrates a first part of the method for processing the query and generation of recommendations.
Figure 2B:
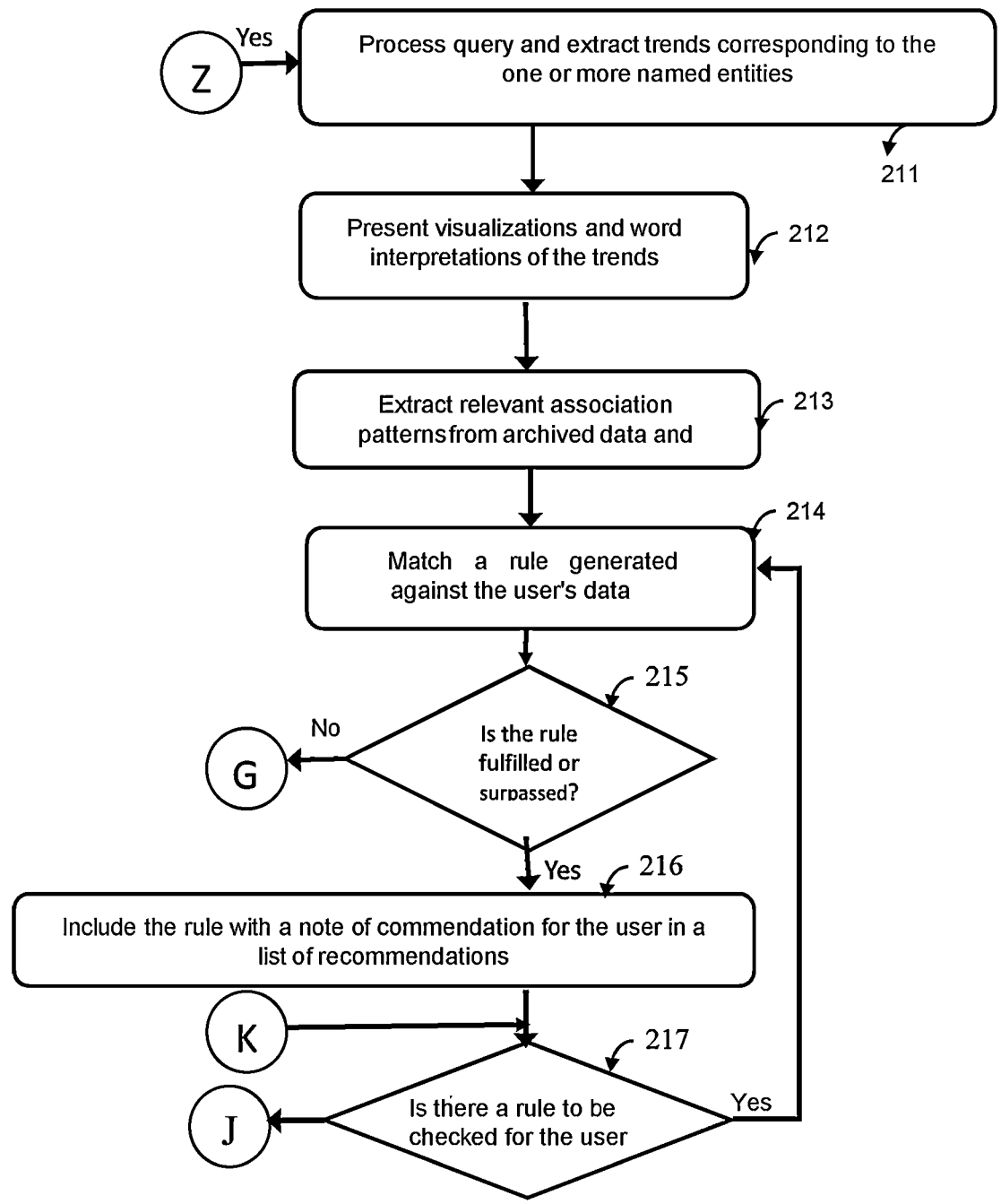
FIG. 2B illustrates a second part of the method for processing the query and generation of recommendations.
Figure 2C:
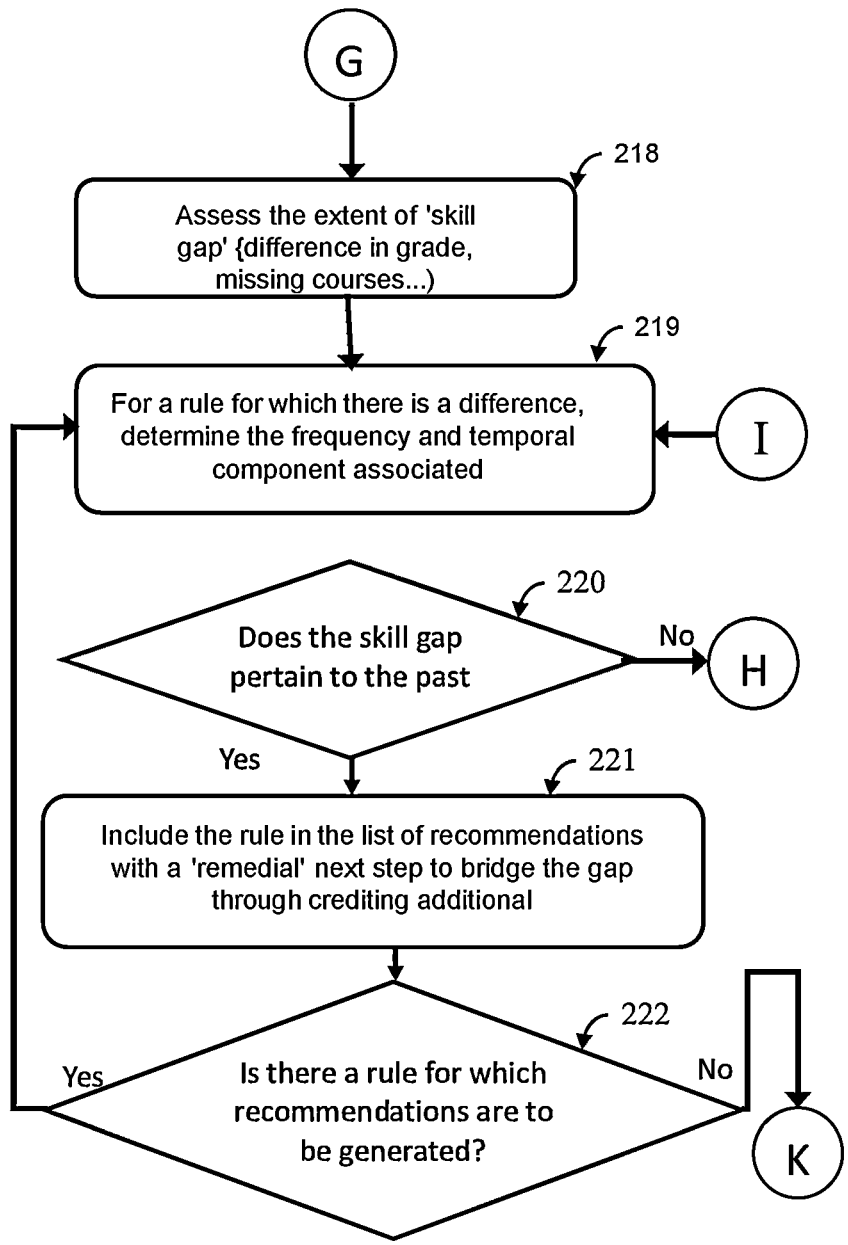
FIG. 2C illustrates a third part of the method for processing the query and generation of recommendations.
Figure 2D:
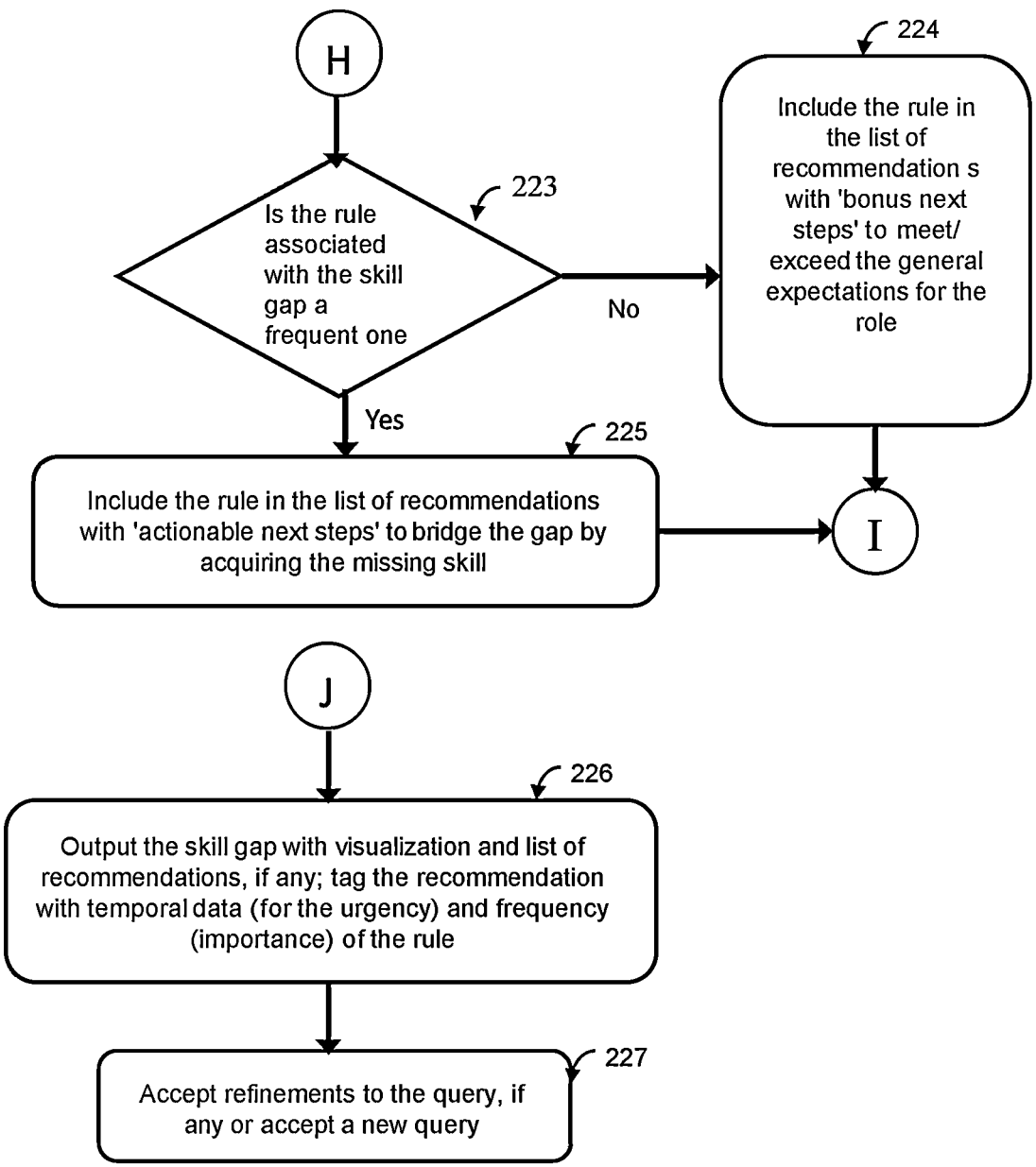
FIG. 2D illustrates a fourth part of the method for processing the query and generation of recommendations.
Figure 3A:
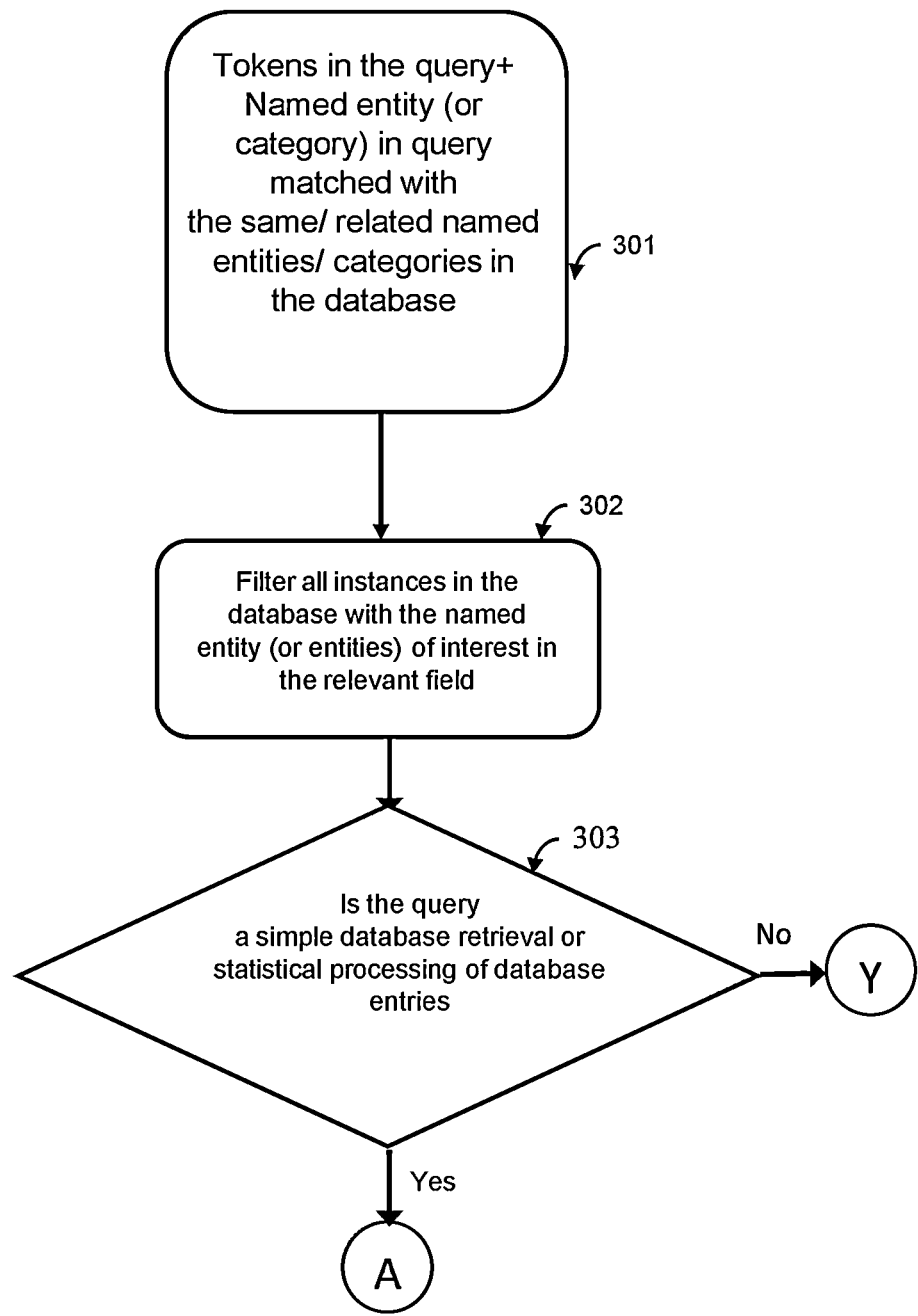
FIG. 3A illustrates a first part of the process for extracting association patterns.
Figure 3B:
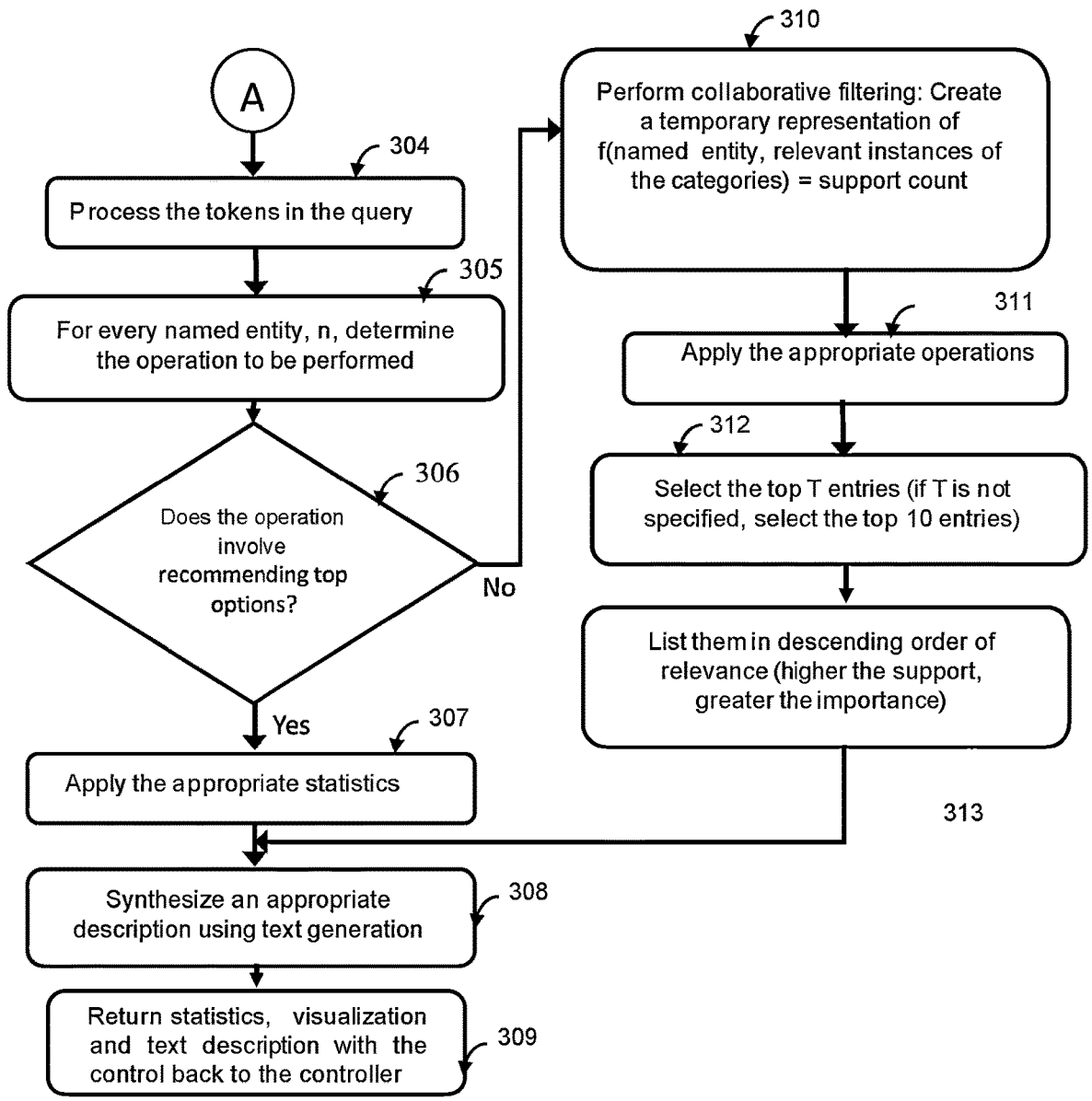
FIG. 3B illustrates a second part of the process for extracting association patterns.
Figure 3C:
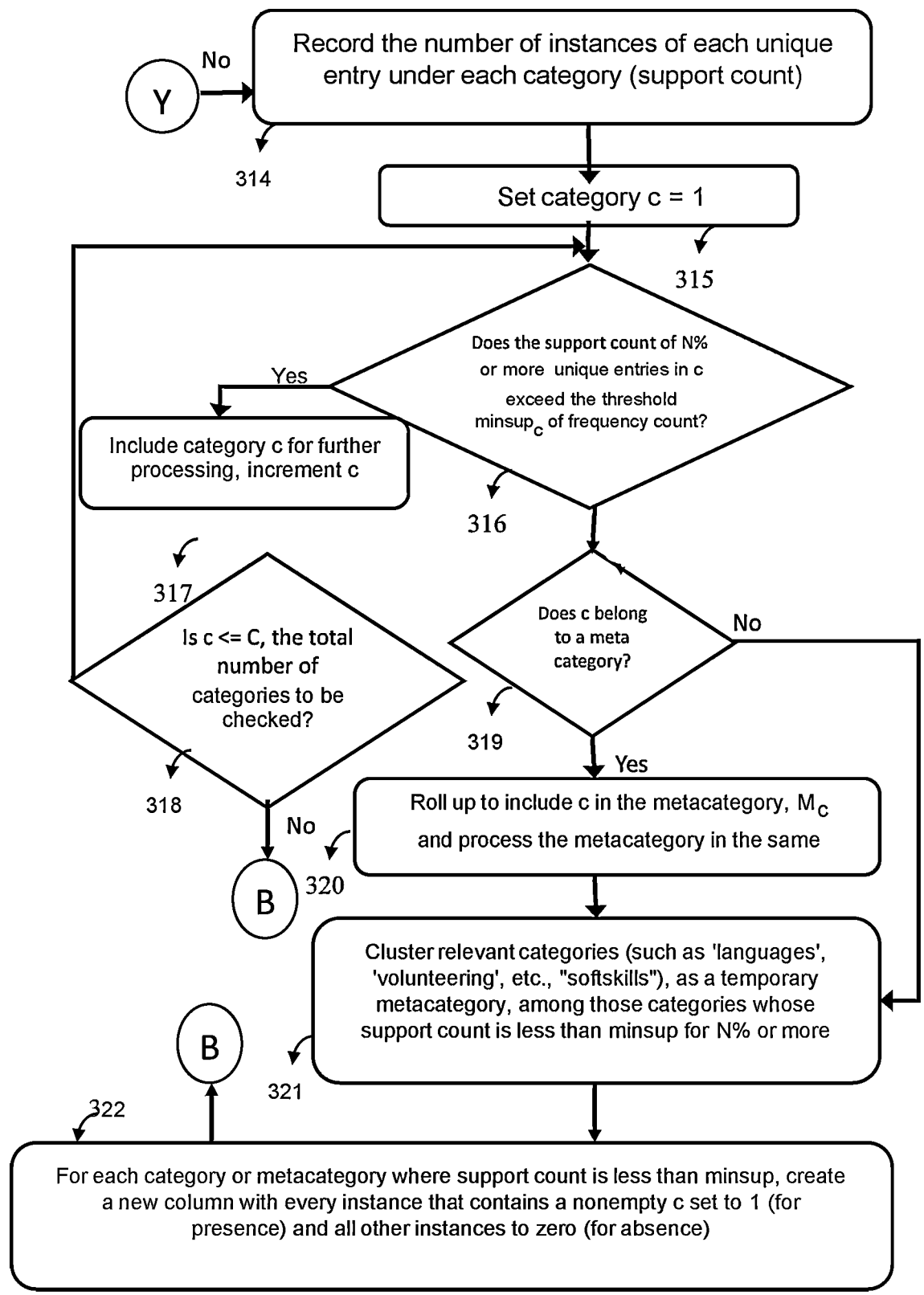
FIG. 3C illustrates a third part of the process for extracting association patterns.
Figure 3D:
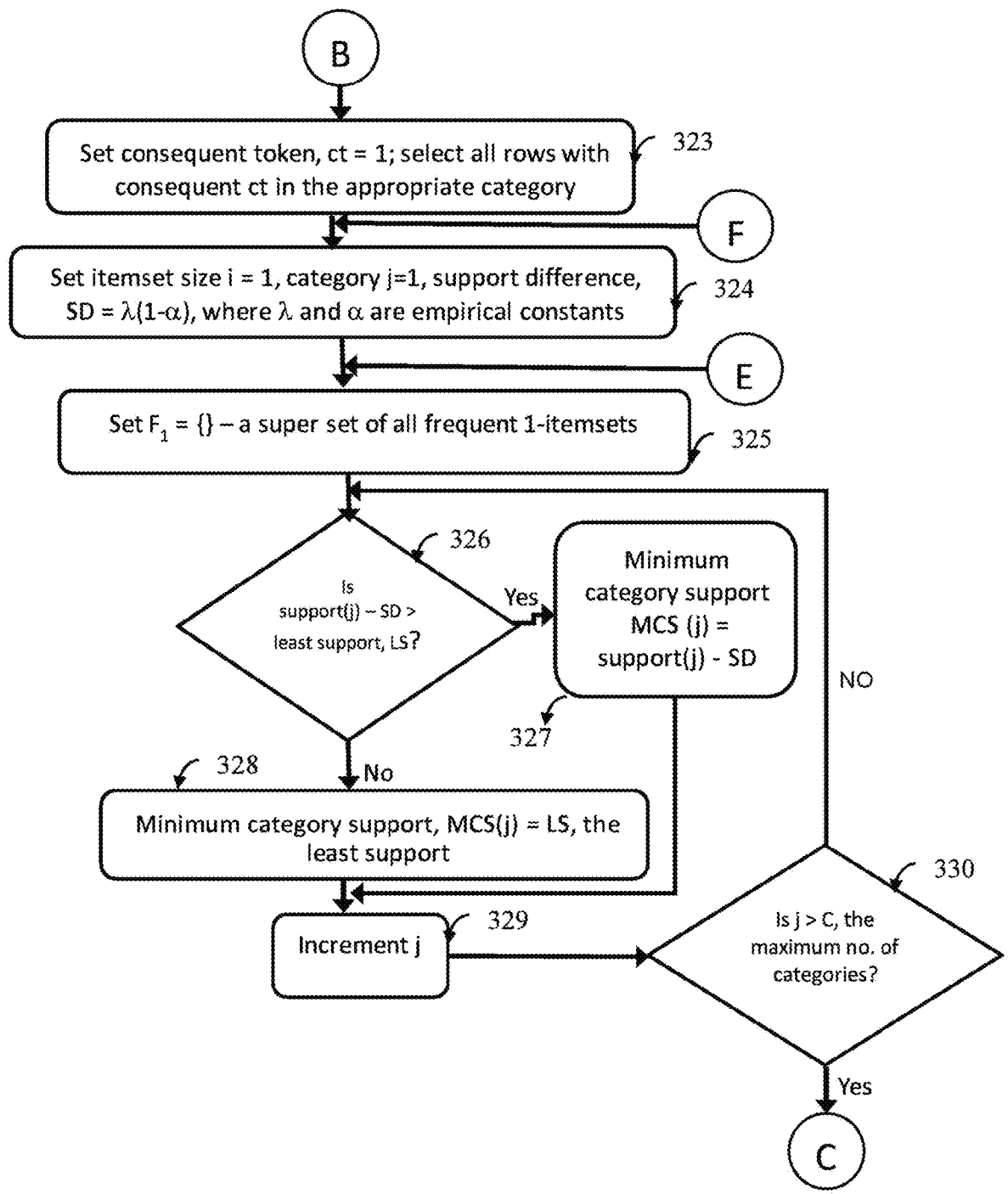
FIG. 3D illustrates a fourth part of the process for extracting association patterns.
Figure 3E:
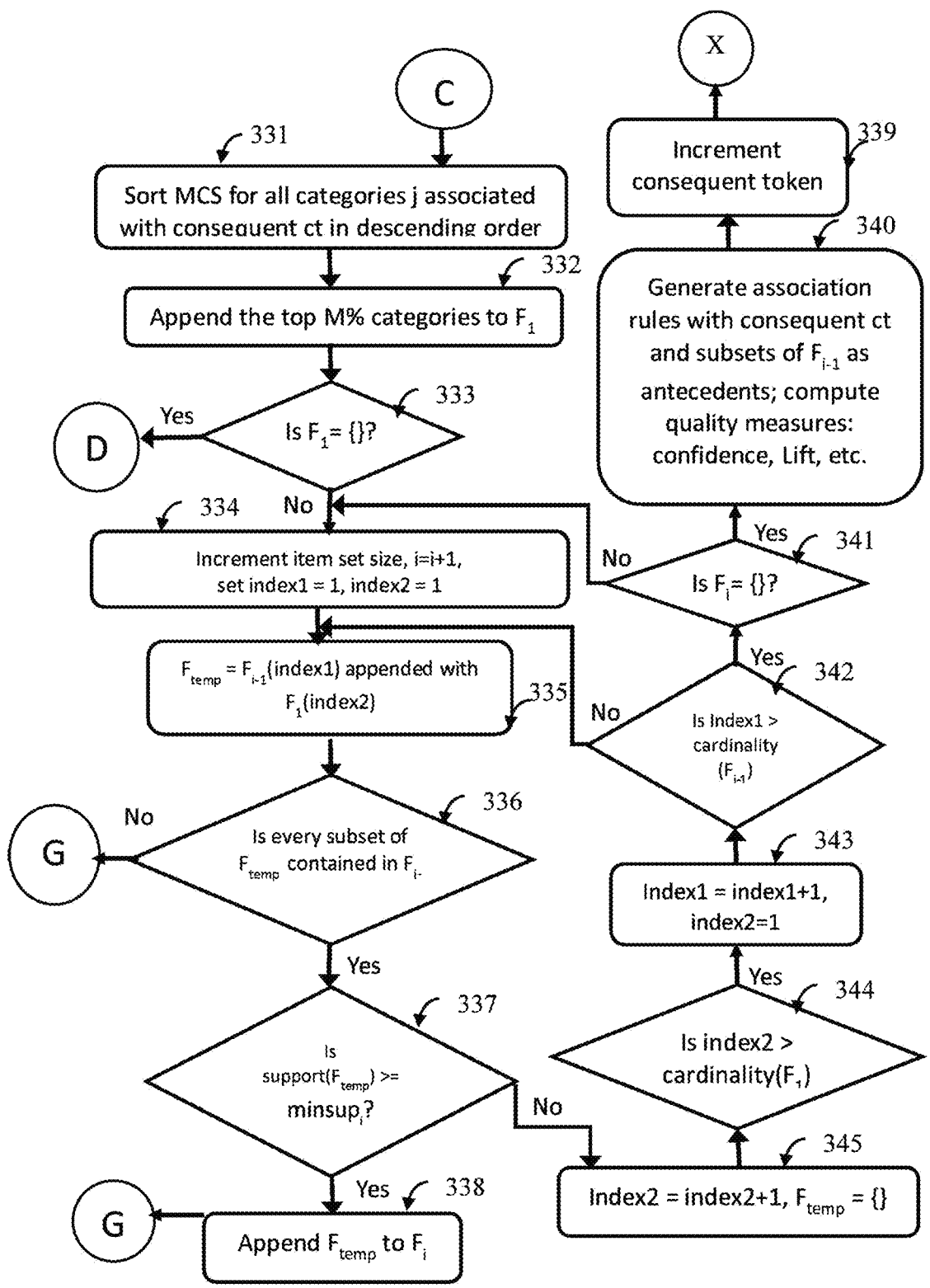
FIG. 3E illustrates a fifth part of the process for extracting association patterns.
Figure 3F:
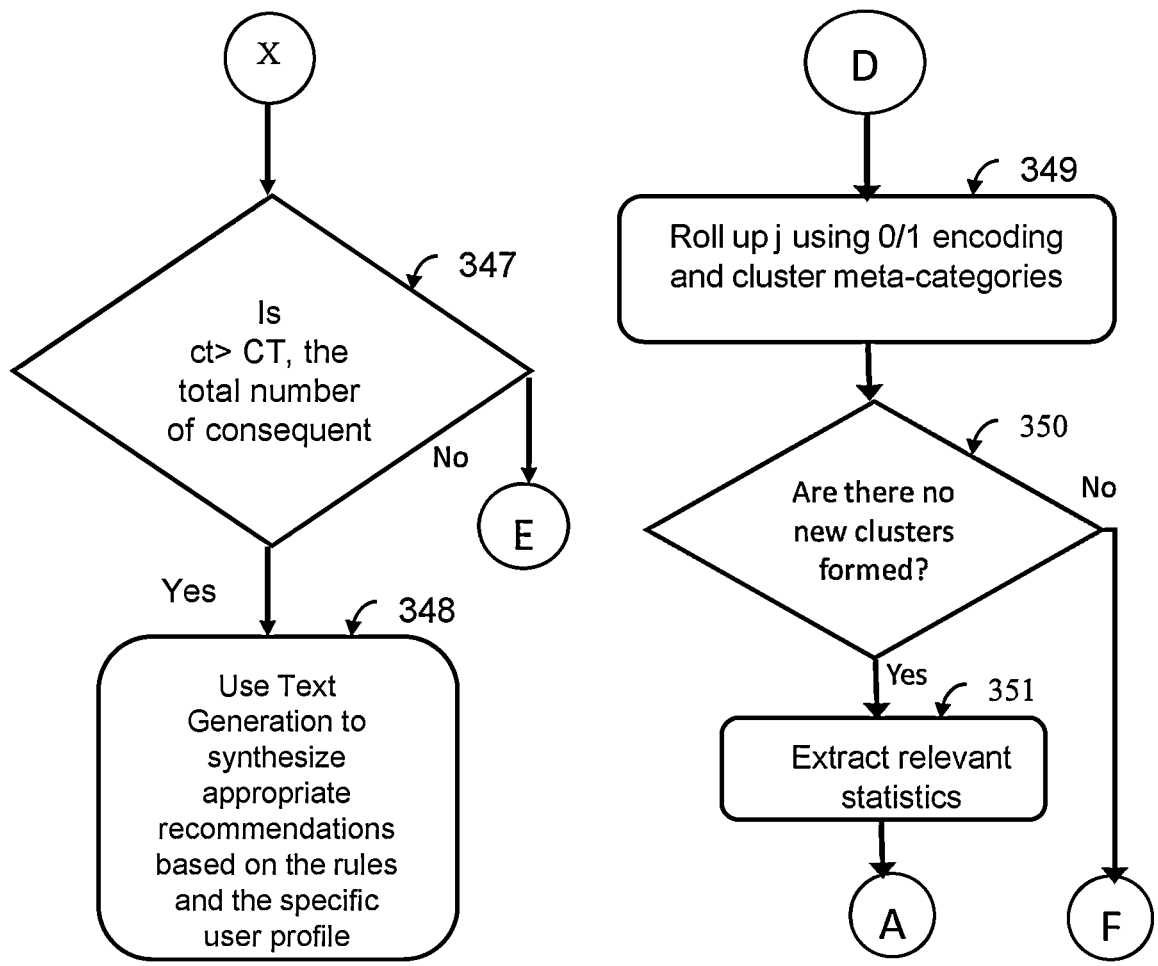
FIG. 3F illustrates a sixth part of the process for extracting association patterns.

Some of the steps in the process flow are elaborated with the aid of the diagrams below:

FIG. 2a, FIG. 2b. FIG. 2c and FIG. 2d illustrate the method of processing the query and generation of recommendations.

Query processing involves (a) analyzing the data through statistical measures and providing suitable visualizations with word descriptions (b) providing visualization and word descriptions of where the user stands with their current profile in comparison to archived data of successful applicants/hires in the past and (iii) providing recommendations regarding courses to be credited based on analyzing the skill gap.

When a search query is entered by the user, it is first parsed 201. This involves tokenizing the sentence, extracting question words (who? (whom? whose?) which? what? when? why? how? where? etc.), named entities (names of people, organizations, geographical locations, etc.) and discourse markers (qualifiers, words of contrast, comparison, causality, emphasis, etc.), if any.

If there are named entities in the query 202, then, for every named entity, the database is scanned for a match 204 (there is provision for strings to match within an edit distance of 'd', that can be specified, but set to 3 by default, to account for spelling errors, etc.).

If there is no match to any named entity in the database, the named entity is checked for category 206 (such as the technical domain, grades, etc.)

If any of the categories match 207, the database entries are filtered based on a mapping of tokens in the query to the closest description of the position(s) advertised in the database 205. The named entities found in these descriptions are collated as the closest match to the named entity in the query 203.

If no category matches are found, the query is progressively parsed to check for a set of rules that map equivalences between domain names (for instance "machine learning" and "pattern recognition" or "content based retrieval" and "pattern matching" or "data mining", etc.) to check if a match can be found. If a match is found, then Step 4 is used to arrive at meaningful named entities.

If no categories are found to match 204, then the top five queries 208 most similar to the input are retrieved and presented to the user.

If a query is selected 210, it is treated as the input query and steps 204-208 is executed.

If none of the queries are selected, then, the query is added to a list of 'queries for review' (and used to update the list of named entities/categories or to manually key in appropriate data in the database for the entry, for later use). A message is displayed to the user that the query could not be processed by the system 209.

The search engine is reset 200 and available to accept new queries.

If there is a match for any of the named entities 202 or if there is a match for any of the categories 204 and appropriate named entities are extracted, the query is processed for mapping of the appropriate question words to answer the query with the relevant statistics or extract trends 211 corresponding to the keywords (for instance, for the query, 'what is the grade in course X of a majority of students hired by Company Y?' a histogram is created of the grades in course X of those employed by company Y from the database and the most common grade extracted to answer the question).

Relevant visualizations 212 are presented as a graph (for instance, a multi-bar chart for the sample query in Step 10 showing the number of students hired for each letter grade of course X by company Y and the 2 companies most similar to company Y). The visualizations are also summarized in words (the most common letter grade in course X of those hired by company Y is: Z, etc.)

Relevant association patterns are extracted 213 from the archived data (based on past placements) and rules are generated.

The antecedent of the rule (grades achieved, courses credited, projects and their domains, etc.) are matched 214 against the querying user's profile.

For each rule generated in Step 213, the user's profile is checked for a match with the rule 217 antecedent(s). With every 'match', the rule is included in a list of recommendations to be output to the user with a note of commendation for having met the criterion 216.

If a rule is not fulfilled 215 by the user, a 'skill-gap' list is populated by measuring the extent of difference between the antecedent(s) of the rule(s) generated against the actual entries in the database for the user.

For every rule that is flagged for 'skill gap', the 'frequency' (for instance, courses offered every semester vis-à-vis once a year, etc.) and 'temporal component' 219 (i.e., does the skill gap refer to one associated with the past such as a high school grade that cannot be changed now? Does the skill gap refer to a skill gap in the present—a course to be credited in the following academic year or an internship to be completed in the upcoming summer? etc.) are determined.

For a skill gap that refers to the past 220 (cannot be changed in the present), the list of recommendations is updated with 'remedial' next steps 221(these are ways to compensate for a missing skill through crediting additional courses or taking up relevant projects, etc.).

For a skill gap in the present, if the frequency is high (such as a course that is offered often), the rule is included under 'actionable next steps' in the list of recommendations 225.

If the skill gap in the present is less frequent (such as a course that is not likely to be offered any time in the upcoming year, etc.), the rule is included under 'bonus next steps'); less frequent rules extracted from the database (such as a semester abroad, etc., that not as frequent as internships, etc.) are also included under 'bonus next steps' 224.

The 'skill gap' is output with appropriate visualizations 226 (such as using spider graphs, etc., to indicate the gap between the current skill and skill level based on past data) and the list of recommendations with 'remedial next steps', 'actionable next steps' and 'bonus next steps' are output to the user, with recommended time tags (or a range of time tags) by which they should plan to accomplish all (or a subset) of the tasks.

FIGS. 3a, 3b, 3c, 3d, 3e and 3f illustrate the process of extracting association patterns.

Input the processed tokens from the query 301 (discourse markers on question tags, etc.) with named entities (name of the company or University, a technical domain or specialization, etc.); in the first step, equivalences are set up to look for related named entities or categories (companies that have made similar job offers in the same domain, etc.)

All the rows that are relevant to the query (are an exact match with the named entity or category or a similar named entity or category) 302 are extracted for processing.

If the query is a simple database retrieval or requires statistical processing of the database 303 (determined using template based comparisons such as 'highest salary', 'most relevant courses', 'most relevant project domains', etc.) the relevant tokens are processed to extract every named entity in the query.

For each named entity, if the query involves recommending the top options 306, descriptive statistics are applied to obtain the top options and appropriate graphs are generated 305 (barcharts for project domains, scatter plots for dependence of the salary offered on grades, etc.)

An appropriate textual description is generated to 'communicate' the numbers computed or 'explain' the graph using template sentence structures. These statistics, the visualization and textual description generated are returned to the controller for display.

If the operation does not involve recommending the top option 306 or eliciting a statistic 307 (percentile, quartile, etc.), collaborative filtering 310 is used through creation of a temporary representation that computes that number of instances for each category that is associated with the named entity.

Relevant categories are filtered out through computational of measures such as the confidence, lift scores for these options and top p options 312 (p corresponds to the top 10% by default) are extracted. These are listed in the descending order of relevance 313 (the option with the greatest support is considered the most relevant in this context).

If the query does not involve a simple statistical processing of the entries 303, the number of instances of each unique entry under the category for each named entity is recorded (this corresponds to the support count for the entry in the category corresponding to the named entity).

For each category c, if the support count exceeds a minimum support count threshold (minsupc) of frequency count for that category, the category c is included in a list for further processing 317.

If the category c does not exceed 316 the threshold minsupc, the category is checked for existence of predefined metacategories 319 (for instance, grades in individual courses are clustered based on the type of courses—math based, programming, etc.). If such metacategories exist, then a rollup operation 320 is performed on the category instances and the new metacategory is treated as a category and step 317 is repeated.

If no predefined metacategory exists, then, relevant categories are clustered based on a predefined criteria 321 (such as 'languages', 'volunteering', etc., under 'soft skills'), a temporary metacategory created for the analysis of the present query. If the metacategory exceeds a threshold of minsup, the metacategory is considered.

If the number of unique entries in the metacategory are too numerous (determined through the support count being less than minsup for N % or more unique entries (N is 60% by default), then, for each category where the support count is less, a new column 322 is created that merely records a 'presence' (numerical value of 1) or 'absence' (numerical value of 0) for that entry (i.e., rather than take into account the specific instances of volunteering work undertaken by the candidate, a 1 indicates the presence of some volunteering work—there could literally be 1 or several instances of volunteering for the candidate, but only 'presence' is noted for further analysis).

After all categories have been processed in this manner, the list of categories associated with each named entity or consequent token, ct, is processed for one consequent token at a time as detailed in the following steps 323.

The size of the itemset (a set of categories) is set to 1, category j is set to 1, support difference, SD=lambda*(1-alpha) 324, where lambda and alpha are empirical constants.

An itemset Fi is a superset of all frequent itemsets of size i. We begin 325 with setting Fi={ }, i=1

For each category j, if the (support(j)−SD)<LS 326, the 'least support' for the category to be considered 328 for further processing, we set the minimum category support (MCS (j))=LS the least support.

If (support(j)−SD)>LS, the least support then, MCS(j)=(support(j)−SD) 327.

Once all categories have been processed, MCS is sorted for all categories associated with the consequent token ct 328. The top M % categories are appended to the frequent itemset Fi 332 and if Fi is nonempty, the size of the itemset i=i+1 334 and we skip to Step 23.

In Step 328, if there are no categories to append to F1 or F1 is an empty set then, the categories are rolled up a further level to a clustering of predefined metacategories or the 0/1 encoding 349 for 'presence' or 'absence' 350 and the procedure is repeated using the metacategory. If no new metacategories are possible, then, relevant statistics are extracted and presented 351.

For every itemset of size i>1, perform the operation of appending 338 every set in Fi−1 with an element from F1.

For every item that is appended, check if every subset is contained in Fi−1. If the subset of the newly formed set, Ftemp is contained in Fi−1 and the support of Ftemp is greater than or equal to the minimum support, then Ftemp is added to Fi 338.

Step 335 is repeated for a new item from F1. Until all elements are exhausted in F1 and Fi−1, through these combinations, we repeat Step 335-336.

If Fi is not an empty set, then, increment i 334, the size of the itemset and repeat steps 335-336.

If Fi is empty 341, then, we generate association rules 340 with consequent ct and subsets of Fi−1 as antecedents. The association rules are generated 340 with the largest subsets of Fi−1 (having the format antecedent implies consequent), computing confidence and lift for each of the rules. Only those rules which exceed the preset thresholds for confidence and lift and whose the supersets of the antecedents are not already present among the rules that exceed the confidence and lift thresholds are extracted and saved in a temporary list of rules, with any others extracted for the current query. The consequent token is incremented (ct=ct+1) 339 and consequent queries are processed. If there are no further consequents to be processed, text generation is used through template-based synthesis of recommendations based on the rules generated and the specific user profile (i.e., if the rule recommends completing three projects in a specific domain and the user has already completed three—then, the rule generated simply stops with 'it is recommended three projects be completed in the area of <domain>. Based on your profile, you have met this requirement.').

The rules generated are returned to the controller for display and enabling of goal setting/tracking for the user's profile.

Figure 4:
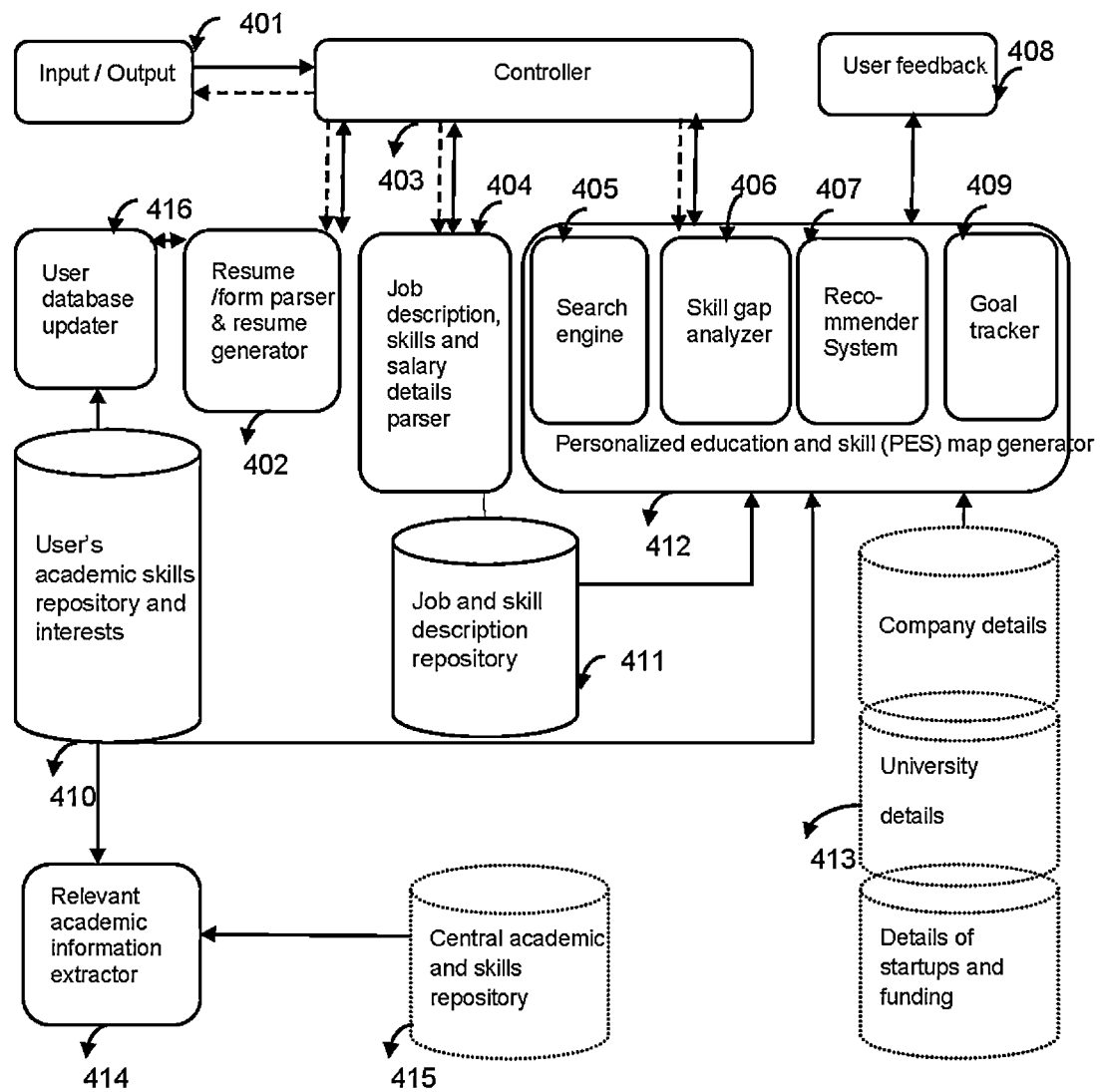
FIG. 4 illustrates the overall system architecture delineating various components of the system.

FIG. 4 illustrates the overall system architecture delineating various components of the system The input device 401 comprises a touchscreen device or keyboard through which the user can login, enter a query phrase or sentence and apply various filters to refine the search or key in details on the academic/skill profile or set goals and, optionally, provide feedback. The output device comprises a touchscreen device or monitor through which is output the results of the search, an alarm/alert for time sensitive goals, a message to track progress for the goals set earlier and screens to output the result of the search/visualize statistics, etc.

The controller 403 comprises the processing unit and 'operating system' of the device, with transfer of control from input/output interface 401 to the various processing units and other components for analysis, visualization and recommendation.

The resume/form parser and resume generator 402 module takes in data from the user regarding projects completed and details thereof, internships or any other employment details, leadership and volunteering roles, skills learned outside the prescribed curriculum, courses completed online, workshops/seminars, etc., attended, research work undertaken/in progress, etc. Alternatively, a resume or curriculum vitae can be uploaded; the parser processes the components of the resume to elicit information in a manner that is amenable for goal setting and tracking and coming up with recommendations based on the user's aspirations. A resume generator 402 collates the information that is necessary and most useful for the purposes intended by the user (or creates a comprehensive curriculum vitae of all the information available) and presents this in a neatly formatted manner.

Figure 5:
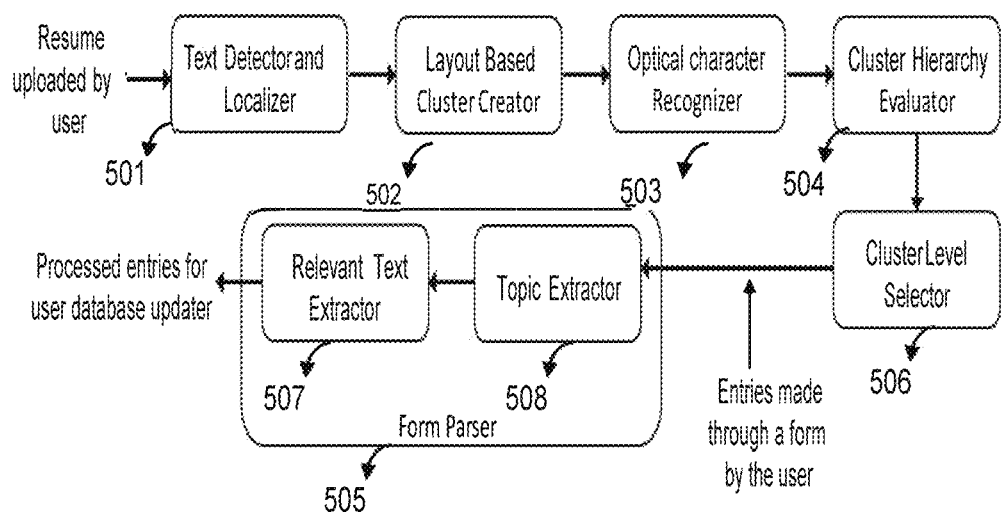
FIG. 5 illustrates the Resume/form parser.

FIG. 5 illustrates a resume/form parser 402 comprising the following submodules.

Text detector 501: Machine learning based classifiers are used to detect the presence of text and obtain bounding boxes around the text Layout based cluster creator 502: The bounding boxes are clustered hierarchically based on spatial proximity.

Optical character recognizer 503: Machine learning based classifiers are used to convert the image of the text (from the uploaded file) to editable text that can be processed in the subsequent steps Cluster hierarchy evaluator 504: The clusters formed by the 'layout based cluster creator' is progressively evaluated to obtain similarities or 'belongingness' of editable text to sections Cluster level selector 506: The evaluations in the previous step are used to delineate sections of text that are more related than others Form parser 505: A form comprises editable text, under relevant categories. This includes topic extractor (the extraction of a topic is merely the retrieval of the relevant tags for a form) and relevant text extractor (the text associated with the category is retrieved). For a resume, the process of topic extraction and relevant text extraction is a little more involved as detailed below:

Topic extractor 508: From each of the sections, the 'topic' is generated for the extracted text (such as 'education', 'experience' etc.) either explicitly through matching from a dictionary of possible section heads from a dictionary or inferring this based on text in that cluster Relevant text extractor 507: The hierarchy in the clustering is used to extract text within a cluster to delineate instances within a topic. The text thus extracted is ready for processing (to remove typographical errors, ensure the date/time stamp if any, etc., are in a specific format for consistency in the database, url, etc., are properly indexed.

This text is now ready to be committed to the users' academic and skill repository and interests database for further processing.

Resume generator 402: is a simple form processor that extracts relevant fields and arranges the text in a pre-set format (as per the 'template'). How 'relevant' a field is for a resume is determined the purpose/goal associated with the resume. If a user wishes to submit a resume to company X (or University Y), then past data of applicants to company X (or University Y) are analyzed to extract trends and conditioned on the job description (or requirements specified by the University), if explicitly available. The default option includes generating a comprehensive resume with all details of academic performance, skills and achievements, pertaining to a user from the database. The user is allowed to 'de-select' options in the interface to generate the resume. Once the resume is generated, the user is allowed to download the file for their use. This resume generator acts as an impetus for users to keep the information on the system as updated as possible.

User database updater 416: The resume parser/form parser elicits information from the resume/form. These need to be checked for redundancy, consistency, etc., with the data of the user stored in the system.

Relevant academic information extractor 414: This component extracts academic data from University sources/courses, etc., database on the user's choice of electives, performance in various courses, etc. These are not required to be keyed in explicitly by a user as learner transcripts, details of the curriculum (courses credited, skills taught in the course, etc.) are available with the University database. This information is extracted and stored in the users' academic and skill repository in a manner that is amenable for further processing.

Job description, skills and salary details parser 404: This is the information from the companies or research labs offering internships and jobs. The information is collected either through forms or through files that are uploaded with relevant information such as the name of the company/research lab, position, job description, duration, pre-requisites (courses, grades, academic qualification, etc.), the stipend/salary that is proposed to be offered, etc. The input is parsed and relevant information is extracted and stored in the job and skill description repository with a timestamp to keep track of research labs/companies that are returning to make offers and the understand the changes, if any, in the skills expected and stipend/salary offered, etc.

Personalized education and skill (PES) map 412: This comprises three components: a search engine, a skill gap analyzer/goal tracker and a recommender system.

Search engine 405: comprises parsing of the query text to extract question words, named entities and discourse markers and map this to relevant instances in the database through a process of matching named entities and/or categories and/or mapping the categories to the nearest named entities, etc., presenting with relevant statistics, visualization and a textual summary of the processed output (as detailed by Steps 1-11 in FIG. 2.1 under the Process Flow Diagram for 'Processing the Query').

Skill gap analyzer 406: comprises checking the aggregated statistics for the relevant search against the skill level of the user as detailed in in FIG. 2.1 under the Process Flow Diagram for 'Processing the Query'.

Recommender system 407: for every 'skill gap' this involves identifying a temporal factor (past or present) to suggest remedial or actionable next steps and the frequency (trend or anomaly) to suggest 'actionable next steps' or 'bonus next steps' based on past data. These list of recommendations as detailed in FIG. 2.1 under the Process Flow Diagram for 'Processing the Query' in FIG. 2.2 under the Process Flow Diagram for 'Extracting association patterns') are output to the user.

Goal tracker 409: presents the list of all recommendations ordered in the decreasing order of their importance/relevance to the query (or multiple queries) and urgency, i.e., the most important and urgent tasks are presented at the top of the list, working its way to the least important and not urgent tasks. The user is free to edit the list of recommendations to flag the goals they would like to track and fulfil. Alarms are set for these goals to keep track of deadlines (such as the last day to sign up for a class, etc.) and reminders are sent (to complete a project in a domain, etc.) with commendations for the goals achieved, to help the user. These goals can be edited at any time, should the user's goals or priorities for achieving these goals change in the course of time.

User feedback 408: a component that the user can choose to engage with to provide feedback on the following:
 (a) Satisfaction of query processing or an explication of what they meant by the query/what they were looking for.

(b) The skill gaps identified by the system.
(C) The list of recommendations and priorities accorded to them (the user is allowed to edit the goals and the priorities accorded to them and to flag any of the recommended next steps as goals to be tracked by the system).
(d) Information ferreted about a company or University or funding agency, etc. in response to the query—perhaps the mapping of some query was not accurate or the information retrieved about a named entity has changed, etc.
(e) Feedback on any aspect of the PES map: search engine, skill gap analyzer, recommender system and goal tracker or record of data in any of the data repositories, etc.

This feedback if tied to any particular aspect (such as a query that failed to be mapped) is processed automatically and sorted into a separate list by category. Feedback is ordered in the decreasing order of frequency, importance (errors in statistics in the repository, etc.) and urgency (time sensitive components such as goal tracking) and presented to the administrative head and (any sensitive information blocked and copied to the) development team. These are reviewed manually and, if any change is required, the necessary action taken to ensure subsequent runs do not throw up these errors/cause the same/similar inconvenience to users.

The preferred embodiment is for the system to be used in a High School or University setting for students to get an exposure of the available options after graduation to set academic and career goals, receive recommendations on the steps that need to be taken based on an analysis of the skill gap and to track the progress. The system is capable of adapting to evolving aspirations of the student and to dynamic changes in the options after graduation through a process of continuous monitoring and regular updates.

The system can be used by University students to identify internships in the industry or research labs and receive recommendations on the next steps to be able to work at any of these places The system can be used by high school students to receive recommendations for college admissions or by undergraduates on next steps towards securing an admit from Graduate Schools or institutions of higher learning and similarly by doctoral students for postdoctoral positions The system can be easily adapted to create awareness of the specializations available for medical students after graduation and for residents on fellowships, etc., as well as other related courses such Masters in Public Health, Hospital Administration, etc.

In another embodiment, the system can be used by aspiring entrepreneurs to understand the potential for funding for various domains and to track and receive recommendations on events to raise funds or venture capitalists or potential investors and other appropriate grants for raising funding for their venture; the system can also help identify suitable mentors, advisors and consultants for the startup.

Even though the system is meant for personal goal setting and tracking and to help a user in their professional growth, the system can be used by employers to understand the skill levels of freshers coming into the system The user academic and skill repository and interests can be replaced with teacher/mentor feedback to help the Department recommend faculty for courses and the slots in which students can get the most benefit The system can be used by Administration heads of Departments to collate placement data of alumni and students enrolled in the institution and drive the system in a direction that maximizes opportunities whether in the industry, research labs or institutions of higher learning.

The user academic and skill repository and interests repository can be replaced with employee feedback and interests to better understand changes that can be introduced to the system in the short and long terms to reduce attrition in the organization The personalized goal setting and tracking can be used to elicit working patterns of users by the organization to ensure teams are composed of members with complimenting skills and compatible working styles The system can be used by potential employers to find the most suited employees through evaluation of the skill level The 'user academic, skill and interests repository' can be replaced with reviews/feedback of books, movies, restaurants, television shows, or series on streaming platforms, etc., to recommend appropriate options for books, movies, restaurants, shows, etc., to the users.

The 'user academic, skill and interests repository' can be replaced with ingredients available and the system used to recommend appropriate recipes based on the user's palette or preferences, nutrition needs and allergies.

The 'user academic, skill and interests repository' can be replaced with medical health records and the 'central repository' with known remedies for various ailments, etc., and the system used to recommend appropriate combination of home remedies or off-the-shelf medicines based on the user's condition, needs, preferences and known allergies.

The 'user academic, skill and interests repository' can be replaced with legal records/applications with supporting documents and 'central repository' with past records of litigations to recommend the type of supporting documents that are to be carried.

The 'user academic, skill and interests repository' can be replaced with personal wealth and financial records and 'central repository' with records of investments of clients to recommend suitable investment options and 'goal tracking' for financial growth and wealth management.

FIGS. 6a, 6b, 6c and 6d illustrate sample screen shots of the user interface and search screens.

Figure 6A:
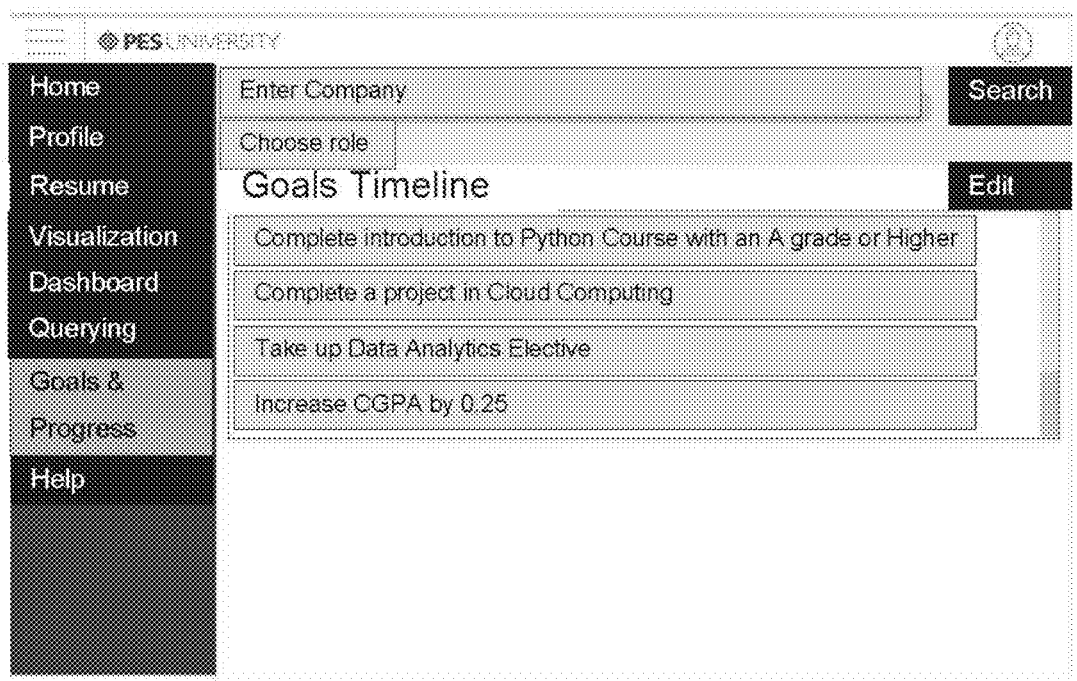
FIG. 6A illustrates a sample screenshot of the login page highlighting the goals and timelines (if any) set for achieving these.

FIG. 6a exemplarily illustrates a screenshot of the login page highlighting the goals and timelines (if any) set for achieving these.

Figure 6B:
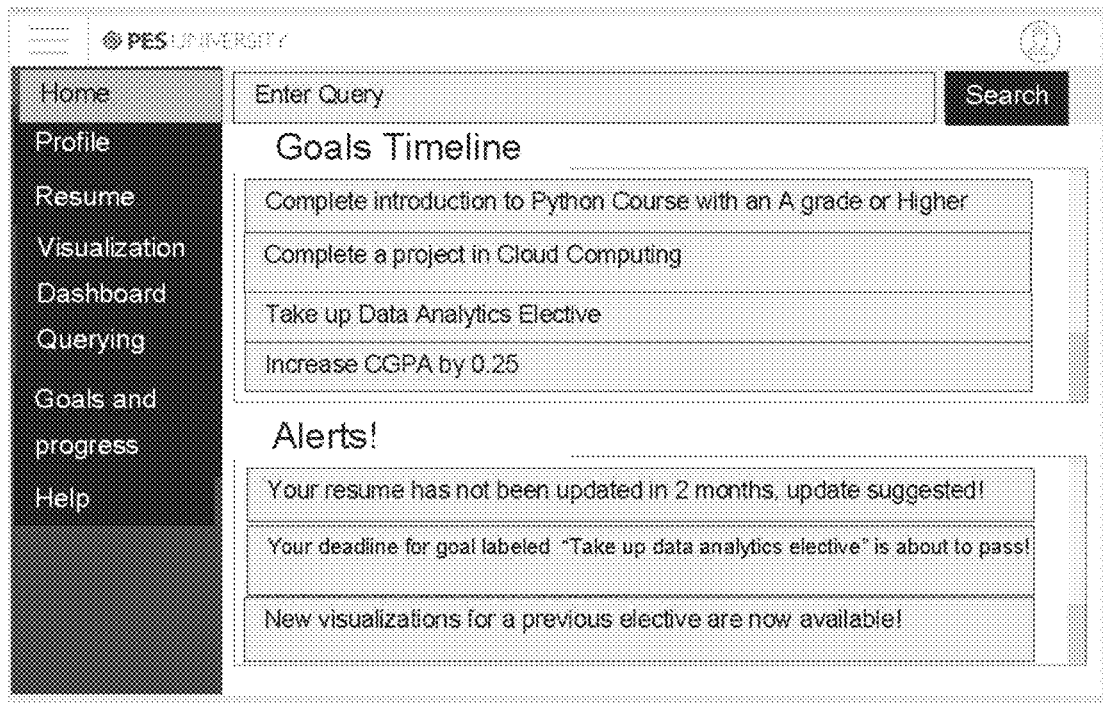
FIG. 6B illustrates a screenshot showing alerts for updating the profile.

FIG. 6b exemplarily illustrates a screenshot showing alerts for updating the profile with any recent achievements, tracking of time sensitive goals—such as crediting pre requisite courses before the signup deadline for being able to credit courses offered in the upcoming semester(s), updates to the system or information on any previous query that may be of interest to the user.

Figure 6C:
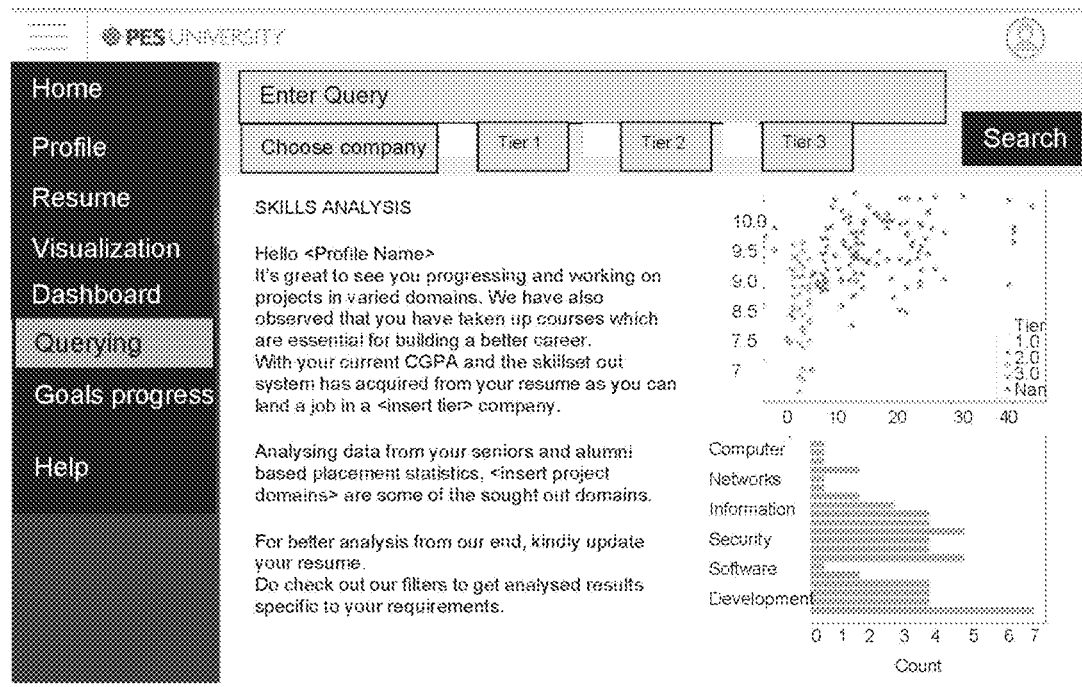
FIG. 6C illustrates a screenshot of an aggregation of the alumni data.

FIG. 6c exemplarily illustrates a screenshot of an aggregation of the alumni data with regard to grades for various tiers of placements and technical domain specialization that were sought after by the companies that recruited in the past year(s), together with a search bar to query multiple details and refine the search.

Figure 6D:
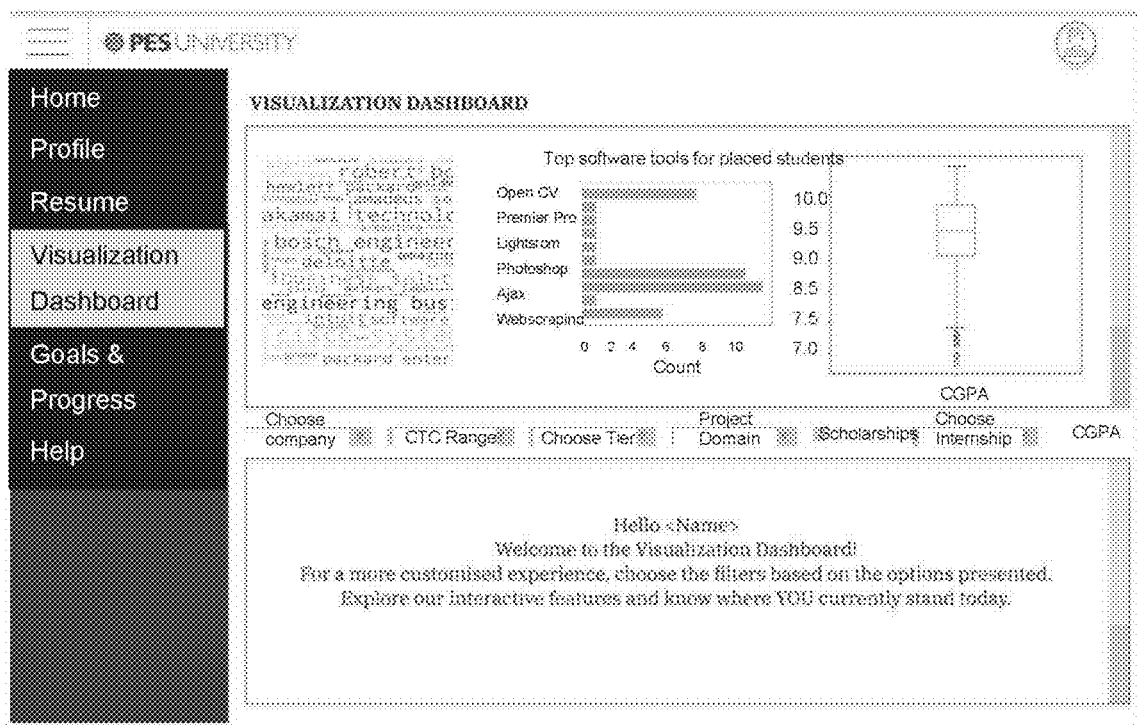
FIG. 6D illustrates a screenshot of the statistics of the recruiters.

FIG. 6d exemplarily illustrates a screenshot of the statistics of the companies that recruited in the past year/have signed up to recruit in the present year and software tools mentioned in the job descriptions and CGPA of students recruited by these companies in the past, together with filters to refine the search in multiple dimensions.

FIGS. 7a, 7b, 7c and 7d exemplarily illustrate sample visualizations for skill gap analysis and presentation of statistics in response to a search query.

Figure 7A:
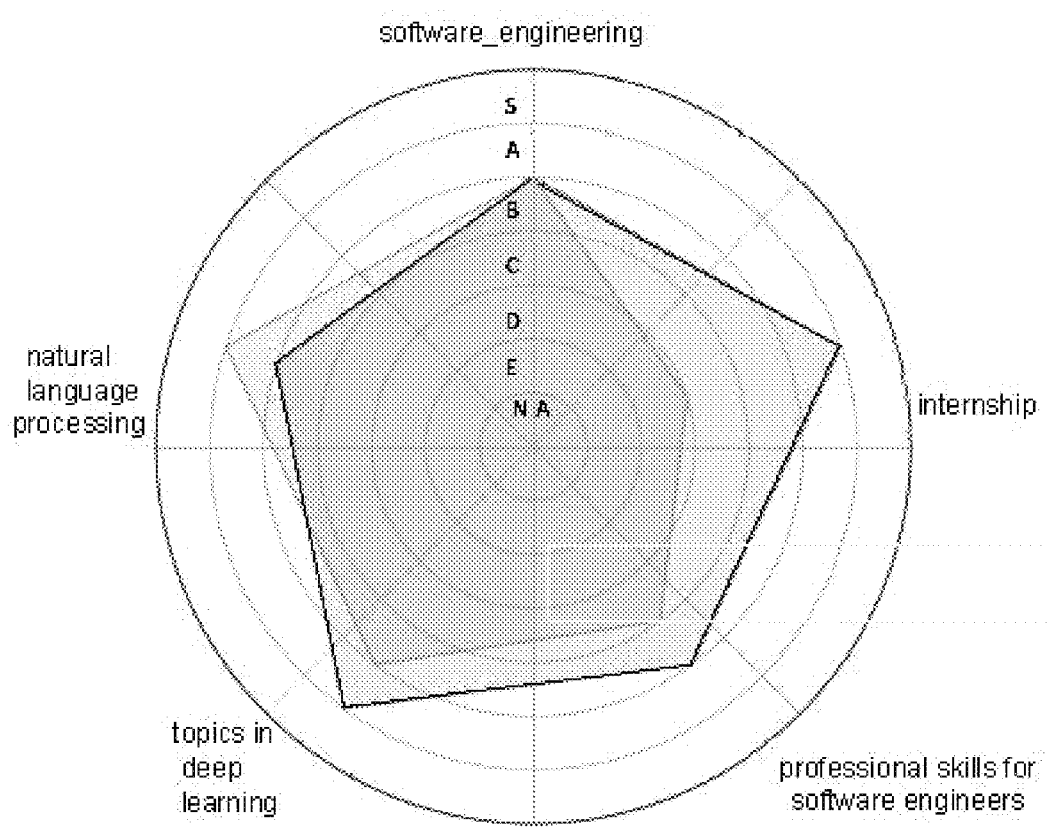
FIG. 7A exemplarily illustrates a spider plot (or radar chart) visualizing the 'optimal skill' for skill gap analysis and presentation of statistics in response to a search query.

FIG. 7(a) exemplarily illustrates a spider plot (or radar chart) visualizing the 'optimal skill' (extracted from trends in the data repository and user's current skill level, clearly indicating the 'skill gap'.

Figure 7B:
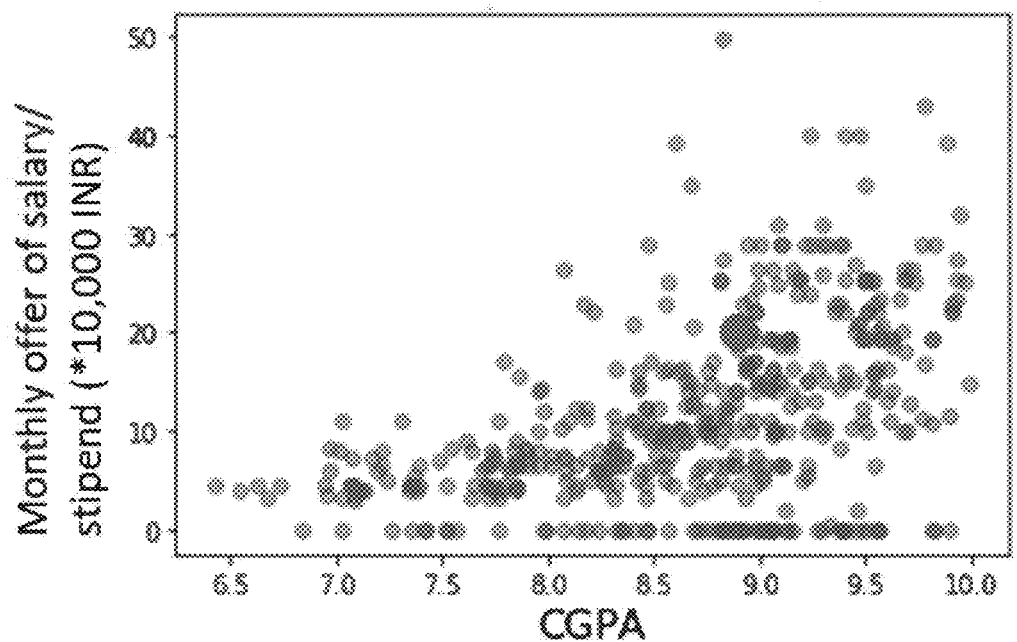
FIG. 7B exemplarily illustrates a scatterplot to visualize the CGPA against monthly pay offers made in the past by an industry specializing in a particular technical domain.

FIG. 7b. Exemplarily illustrates a scatterplot to visualize the CGPA against monthly pay offers made in the past by an industries specializing in a particular technical domain. The user's CGPA and projected monthly pay as on the current date is visualized in red to help them set the right expectations, chart the right course ahead.

Figure 7C:
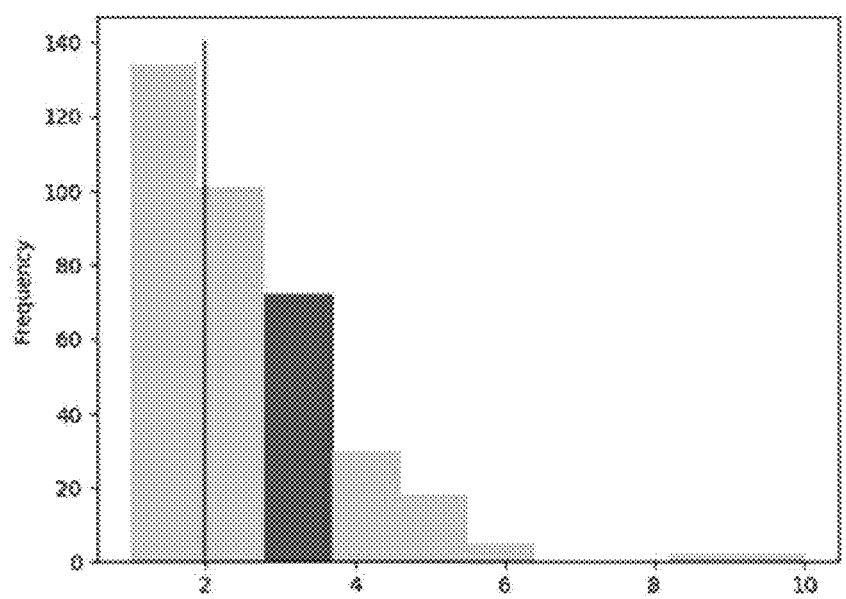
FIG. 7C exemplarily illustrates the visualization of a user who exceeds expectations for a category with respect to their query.

FIG. 7c exemplarily illustrates a visualization of a user who exceeds expectations for a category with respect to their query.

Figure 7D:
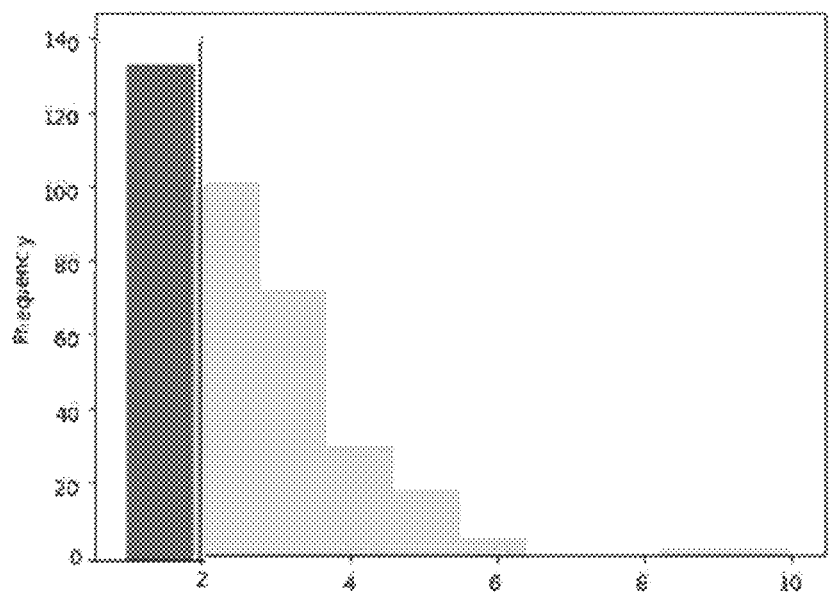
FIG. 7D exemplarily illustrates the visualization of a user who has fewer than the 'optimal' recommended for a category with respect to a query.

FIG. 7d exemplarily illustrates a visualization of a user who has fewer than the 'optimal' recommended for a category with respect to a query. Recommendations are derived from these skill gaps.

The processing steps described above may be implemented as modules. As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skills in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

In general, the modules/routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Modules might be implemented using a general-purpose or special-purpose processing engine such as, for example, a microprocessor, controller, or other control logic. In the illustrated example, the modules could be connected to a bus, although any communication medium can be used to facilitate interaction with other components of computing modules or to communicate externally.

The computing server might also include one or more memory modules, simply referred to herein as main memory. For example, preferably random access memory (RAM) or other dynamic memory, might be used for storing information and instructions to be executed by processor. Main memory might also be used for storing temporary variables or other intermediate information during execution of instructions to be executed by a processor. Computing module might likewise include a read only memory ("ROM") or other static storage device coupled to bus for storing static information and instructions for processor.

The database module might include, for example, a media drive and a storage unit interface. The media drive might include a drive or other mechanism to support fixed or removable storage media. For example, a hard disk drive, an optical disk drive, a CD, DVD or Blu-ray drive (R or RW), or other removable or fixed media drive might be provided. As these examples illustrate, the storage media can include a computer usable storage medium having stored therein computer software or data.

In alternative embodiments, the database modules might include other similar instrumentalities for allowing computer programs or other instructions or data to be loaded into the computing module. Such instrumentalities might include, for example, a fixed or removable storage unit and an interface. Examples of such storage units and interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The invention claimed is:

1. A computerized system for receiving a real time goal set by a student, performing skill gap analysis and providing a tailored recommendation for said student to fill said skill gap in an educational institution, comprising:

an input/output device serving as an interface for said student;

a controller processing unit and operating system, with transfer of control from said input/output device to a personalized education and skill map generator module;

a database repository of student, university and recruiter information;

said personalized education and skill map generator module, further comprising:

a search engine for receiving a query from said student on a career goal, parsing of said query of said student to extract question words, named entities and discourse markers, and map said extractions to relevant instances in said database, wherein said search engine applies a modified adaptive association pattern mining model for creation of meta categories to capture infrequent patterns or rare opportunities available to the student, and conducts a drill-down for specifics to cater to individual needs of said student, said modified adaptive association pattern mining model performing the processes of:

dynamically forming categories through recording instantiations within a single category as equivalent, and encoding its presence 1 or absence 0, and clustering of related categories through a curated and/or domain-aware hierarchy of categories to determine meaningful frequent itemsets, wherein said itemsets contribute to the generation of association patterns or rules;

automatically drilling down within a sub-set of relevant rows of data to match with a student's profile and elicit the most relevant instantiations of a metacategory to make meaningful specific recommendations to the student;

modeling a trend in historical data in a dataset, and forming new associations through observing changes in the instantiations within a category and thereby adapting to changes in real-time;

a skill gap analyzer module for checking aggregated statistics for a search conducted through said search engine against a skill level of said student, and identifying the skill gap of the student;

recommender module for identifying a temporal factor for every said skill gap to suggest remedial or actionable next steps and for identifying a frequency to suggest actionable next steps or bonus next steps recommendations based on past data; and goal tracker module for presenting a list of all said recommendations ordered in a decreasing order of their importance and urgency, wherein said goal tracking module provides an assessment of a time-sensitivity of a goal and a mechanism for students to track their progress through prioritizing short and long term goals, and wherein these goals are assessed at regular intervals with reminders at a frequency determined by a user and alerts to any opportunities that would facilitate achieving the goals.

2. The system of claim 1, further comprising:

a resume parser and resume generator in communication with said controller;

a user database updater that checks for consistency and redundancy of the information elicited by said resume parser;

a relevant academic information extractor that extracts academic data from university sources in said database; and a job description, skills and salary details parser that parses the recruiting forms for job related information and stores in the job and skill description repository with a timestamp to keep track of hiring firms that are returning to make offers.

3. The system of claim 1, wherein said output device comprises a touchscreen device or monitor through which is output results of the search, an alarm or alert for time sensitive goals, a message to track progress for the goals set earlier and screens to output the result of the search.

4. The system of claim 1, further comprising a user feedback module that the user can choose to engage with to provide feedback on one or more of the following: satisfaction of query processing, said skill gaps identified, said recommendations and priorities accorded, and information ferreted about a company, university, or funding agency.

5. He system of claim 1, further comprising an analytics dashboard with filters for visualization for a choice of a recruiting company in correlation with the importance of core courses, choice of electives, grades in various courses, number and type of internships and number of type of projects.

6. The system of claim 5, wherein said analytics dashboard provides a job placement office of said institution with the type of recruiting companies, skill sets required, and timeline of requesting for interviews with said student.

7. The system of claim 1, wherein said skill gap analyzer module and said search engine sets and tracks personal goals, with a continual update of the opportunities and with a provision for said goals to evolve.

8. He system of claim 1, wherein said recommendation module recommends actions that can be taken at three levels: actionable next steps, remedial next steps and bonus next steps towards reaching the goals set.

9. The system of claim 1, wherein said recommendation module mines association patterns and elicits rules towards tangible recommendations after identifying obvious trends.

10. The system of claim 1, wherein said personalized education and skill map generator module adapts to evolving aspirations of the student and to dynamic changes in options after graduation through a process of continuous monitoring and regular updates, providing for course correction or adapting to changing aspirations of the student through modifying the queries or opportunities to be tracked, leading to a change in the recommendations made by said system and in turn a modification of said goals.

11. The system of claim 1, wherein said personalized education and skill map generator module identifies internships and job placements in industry or academia, and provides recommendations to secure said internships and job placements.

12. A computer implemented method for personalized education and skill mapping of a student in an educational institution, comprising:

updating academic and skills repository of said student;

performing skill gap analysis and displaying a progress chart for all goals set by the student and displaying alerts for time sensitive goals;

providing the student an option to edit said goals, and thereafter updating a goal tracker;

accepting a student search query text, and processing the query aided by inputs from the student's academic and skills repository, hiring firm's details and university details;

parsing of said query of said student to extract question words, named entities and discourse markers, and map said extractions to relevant instances in a database, and applying a modified adaptive association pattern mining model for creation of meta categories to capture infrequent patterns or rare opportunities available to the student, and conducts a drill-down for specifics to cater to individual needs of said student;

applying similarity measures to map descriptions and positions advertised by named entities in said query without a match to the closest group of named entities in company details and job and skill description database;

extracting trends corresponding to said named entities;

presenting visualizations and word interpretations of said trends;

extracting relevant association textual patterns from archived data and generate rules;

matching said rules generated against student's data;

outputting the skill gap with visualization and a list of recommendations, and tagging said recommendations with temporal data and frequency of the rule for updating said goal tracker and alerts; and outputting results of said search query with recommendations.

13. The method of claim 12, wherein said step of matching said rule generated against student's data further comprises the steps of:

wherein if said rule is not fulfilled;

assessing an extent of skill gap;

determining the frequency and temporal component associated with the skill gap;

wherein if the skill gap does not pertain to a past student data;

wherein if the rule associated with the skill gap is not a frequent one;

include the rule in the list of recommendations with bonus next steps to meet or exceed general expectations for a role;

wherein if the rule associated with the skill gap is a frequent one, include the rule in the list of recommendations with actionable next steps to bridge the skill gap by acquiring missing skills; and wherein if the skill gap pertains to a past student data;

including the rule in the list of recommendations with a remedial next step to bridge the skill gap through crediting additional courses or undertaking a relevant project.

14. The method of claim 12, wherein said step of extracting relevant association patterns from archived data and generate rules comprises the steps of, inputting processed tokens from said search query with said named entities;

identifying equivalences of said tokens;

extracting for processing all rows that are relevant to said query, wherein said rows comprise historical student data;

wherein if the query is a direct retrieval from a historical student database or does not require statistical processing of said database;
  a. applying descriptive statistics to said extracted rows to obtain top options and generating graphs;
  b. generating textual description to communicate numbers computed or explain said generated graph using template sentence structures;
  c. displaying statistics, said graph's visualization, and said generated textual description;

wherein if the query is not a direct database retrieval or requires statistical processing of the database;
  set category c=1, wherein the category refers to columns of a historical student database;

if a support count of N % or more unique entries in said c exceed a threshold minsup of frequency count, include category c for further processing and increment c, wherein N and minsup are empirical thresholds;

if the support count of N % or more unique entries in c does not exceed said threshold minsup of frequency count, and if c belongs to a meta category, roll up to include c in metacategory, Mc and process said metacategory in the same manner as other categories;

cluster related categories dynamically as a temporary metacategory, and among those categories whose support count is less than minsup for N % or more unique entries to create metacategory Mc; and for each unique category c or said metacategory Mc, if the support count exceeds a threshold minsup, the category c or metacategory Mc is included for further processing;

if the entries in category c or metacategory Mc do not exceed the threshold for minimum support count, then perform a roll up operation to include c in a new metacategory, formed by grouping of similar categories;

for each category c, or said new metacategory, set a consequent token, $c_t=1$ and set a threshold support difference $SD=\lambda(1-\alpha)$, where $\lambda$ and $\alpha$ are empirical constants and category j=1;
  select all the rows in said historical student database corresponding to category or metacategory, j, which contain the consequent token corresponding to $c_t$;
  create an empty set $F_1$ for all frequent categories or metacategories, said frequent categories are those categories that have minsup or more rows;

dynamically setting the minimum category-support, MCS for each category or metacategory, comprising the step of:
  if a difference between a number of rows with the category j and SD is greater than the least support for that consequent id, then, the minimum category-support, MCS, is updated to the difference between support of category j and SD; else, the minimum category-support is updated to the least support;

sort the rows based on category-support for all categories and metacategories corresponding to a consequent $c_t$;

append top M % of the categories of said sorted rows to $F_1$ and treat each of said appended categories as frequent 1-itemsets;

if $F_1$ remains empty, roll up the category, using a 0 for absence and 1 for presence of the category, in place of the specifics associated with an experience and clustering meta-categories to facilitate creating nonempty itemsets;

if $F_1$ is not empty, form $F_2$, a superset of all 2-frequent itemsets as a union of one itemset in $F_1$ with another distinct itemset in $F_1$, ensuring every combination is valid, through checking that every subset of $F_2$ is indeed from $F_2$, and then form $F_3$ and so on until $F_n$, until no larger set of frequent-itemsets can be formed associated with a rule consequent token ct=1;

generate association rules for each consequent token, ct, with subsets of the said largest frequent itemsets Fn as antecedents and retaining only those rules that meet empirically determined quality measures of confidence and lift;
match said generated association rules against a student's profile, as input for a recommendation generation process;
generate text to translate an association rule $F_1\{j\} \rightarrow c_t$ to synthesize an appropriate recommendation in text; and
match said recommendation in text against placement and academic databases, and then input said recommendation to the goal tracking component for appending a time-sensitivity associated with the rule.

* * * * *